US012699171B2

(12) United States Patent (10) Patent No.: US 12,699,171 B2
Song et al. (45) Date of Patent: Aug. 4, 2026

(54) FREQUENCY BAND STATE DETERMINING METHOD AND RELATED DEVICE

(71) Applicant: Yinwang Intelligent Technologies Co., Ltd., Shenzhen (CN)

(72) Inventors: Sida Song, Beijing (CN); Sha Ma, Beijing (CN); Lei Gao, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 496 days.

(21) Appl. No.: 17/849,035

(22) Filed: Jun. 24, 2022

(65) Prior Publication Data

US 2022/0326369 A1 Oct. 13, 2022

Related U.S. Application Data

(63) Continuation of application No. PCT/CN2020/139071, filed on Dec. 24, 2020.

(30) Foreign Application Priority Data

Dec. 27, 2019 (CN) .......................... 201911402854.1

(51) Int. Cl.
*G01S 13/28* (2006.01)
*G01S 13/56* (2006.01)
(52) U.S. Cl.
CPC ............ *G01S 13/282* (2013.01); *G01S 13/56* (2013.01)
(58) Field of Classification Search
CPC ........ G01S 13/282; G01S 13/56; G01S 7/021; G01S 7/36; G01S 13/931; H04W 76/27; H04B 1/123
See application file for complete search history.

(56) References Cited

U.S. PATENT DOCUMENTS

| 7,605,745 | B2 | 10/2009 | Honda et al. |
| 2005/0174963 | A1 | 8/2005 | Hsu |
| 2007/0018886 | A1 | 1/2007 | Watanabe et al. |

(Continued)

FOREIGN PATENT DOCUMENTS

| CN | 101895894 A | 11/2010 |
| CN | 107991652 A | 5/2018 |

(Continued)

*Primary Examiner* — William Kelleher
*Assistant Examiner* — Juliana Cross
(74) *Attorney, Agent, or Firm* — Leydig, Voit & Mayer, Ltd.

(57) ABSTRACT

A frequency band state determining method and a related device are provided. The method includes: A detection apparatus determines an intermediate frequency signal based on a detected interfering signal in an environment and an oscillation signal that belongs to a first frequency band. The detection apparatus performs first processing on the intermediate frequency signal, to obtain a first detection result, and when the first detection result indicates that the first frequency band is busy, the detection apparatus performs second processing on the intermediate frequency signal, to obtain a second detection result. The detection apparatus determines a state of the first frequency band based on the second detection result. The detection apparatus may be a radar, and the radar may work in a use scenario of a cooperative radar.

15 Claims, 15 Drawing Sheets

(56) References Cited

U.S. PATENT DOCUMENTS

| | | | |
|---|---|---|---|
| 2007/0171122 A1* | 7/2007 | Nakano | G01S 7/023 |
| | | | 342/91 |
| 2008/0094274 A1 | 4/2008 | Nakanishi | |
| 2010/0019950 A1* | 1/2010 | Yamano | G01S 7/352 |
| | | | 342/104 |
| 2016/0033622 A1 | 2/2016 | Martone et al. | |
| 2017/0187418 A1* | 6/2017 | Dafesh | H04B 1/1027 |
| 2020/0025867 A1* | 1/2020 | Chen | G01S 7/0232 |
| 2021/0190907 A1* | 6/2021 | Sahara | G01S 13/42 |

FOREIGN PATENT DOCUMENTS

| | | |
|---|---|---|
| CN | 109085568 A | 12/2018 |
| CN | 109407088 A | 3/2019 |
| CN | 110418310 A | 11/2019 |
| KR | 20120000322 A | 1/2012 |
| WO | 2019106656 A1 | 6/2019 |

\* cited by examiner

Amplitude A

Time t

Transmitted signal

Radar 1

Target object

Reflected signal

*Interfering signal*

Radar 2

FREQUENCY BAND STATE DETERMINING METHOD AND RELATED DEVICE

CROSS-REFERENCE TO RELATED APPLICATIONS

This application is a continuation of International Application No. PCT/CN2020/139071, filed on Dec. 24, 2020, which claims priority to Chinese Patent Application No. 201911402854.1, filed on Dec. 27, 2019. The disclosures of the aforementioned applications are hereby incorporated by reference in their entireties.

TECHNICAL FIELD

This application relates to the field of computer technologies, and in particular, to a frequency band state determining method and a related device.

BACKGROUND

A vehicle-mounted radar plays a vital role in assistant driving and autonomous driving of an intelligent vehicle. In a traveling process of the intelligent vehicle, the vehicle-mounted radar can detect an ambient environment, and identify and track objects around the vehicle (for example, other vehicles, pedestrians, roadblocks, and buildings). Further, an advanced driving assistant system (ADAS) of the intelligent vehicle can sense a possible danger based on a detection result of the vehicle-mounted radar and prompt a driver in a timely manner, or autonomously take preventive measures, to improve driving safety and comfort of the intelligent vehicle.

As a penetration rate of a vehicle-mounted radar increases, mutual interference between vehicle-mounted radars of intelligent vehicles becomes increasingly severe, greatly reducing detection accuracy of the vehicle-mounted radars. To avoid mutual interference between vehicle-mounted radars, before the intelligent vehicle transmits a radar signal, a frequency band that does not overlap a frequency band of another radar transmit device may be selected, to avoid interference from the source. In a conventional technology, the vehicle-mounted radar listens to a radio frequency signal in the environment, and determines a state of each frequency band through threshold detection. For one frequency band, because different manufacturers have different detection thresholds, and different detection results are generated, radars of some manufacturers cannot select the frequency band as an operating frequency band. In addition, a state of the frequency band is detected only through threshold detection and anti-interference capabilities of radars from different manufacturers cannot be fully utilized, causing limited resources for selection.

SUMMARY

Embodiments of this application provide a frequency band state determining method, so that fairness in selecting resources can be balanced, and a frequency band state can be determined with reference to an anti-interference capability of a detection apparatus, to increase resource utilization.

According to a first aspect, an embodiment of this application provides a frequency band state determining method, applied to a detection apparatus. The method includes: receiving a radio frequency signal; determining an intermediate frequency signal based on an oscillation signal and the radio frequency signal, where the oscillation signal belongs to a first frequency band; performing first processing on the intermediate frequency signal, to determine a first detection result; determining, based on the first detection result, to perform second processing on the intermediate frequency signal; performing the second processing on the intermediate frequency signal, to determine a second detection result; and determining a state of the first frequency band based on the second detection result. By using this method, a frequency band state is determined by using a same threshold, so that fairness in selecting resources can be balanced. In addition, the frequency band state can be determined with reference to an anti-interference capability of the detection apparatus, to increase resource utilization.

In a possible implementation, the performing first processing on the intermediate frequency signal, to determine a first detection result includes: performing intermediate frequency detection on the intermediate frequency signal, to determine an amplitude or a power of the intermediate frequency signal; and comparing the amplitude of the intermediate frequency signal with a first threshold, or comparing the power of the intermediate frequency signal with a second threshold, to determine the first detection result.

In a possible implementation, the determining, based on the first detection result, to perform second processing on the intermediate frequency signal includes: if the amplitude of the intermediate frequency signal is greater than the first threshold, or the power of the intermediate frequency signal is greater than the second threshold, determining to perform the second processing on the intermediate frequency signal.

In a possible implementation, the performing first processing on the intermediate frequency signal, to determine a first detection result includes: sampling the intermediate frequency signal, to obtain a plurality of first sampling points; and comparing a quantity of second sampling points with a third threshold, or comparing a ratio of a quantity of second sampling points to a quantity of the plurality of first sampling points with a fourth threshold, to determine the first detection result, where the second sampling point is a sampling point whose amplitude is greater than a fifth threshold in the plurality of first sampling points, or a sampling point whose power is greater than a sixth threshold in the plurality of first sampling points.

In a possible implementation, the determining, based on the first detection result, to perform second processing on the intermediate frequency signal includes: if the quantity of the second sampling points is greater than the third threshold, or the ratio of the quantity of the second sampling points to the quantity of the plurality of first sampling points is greater than the fourth threshold, determining to perform the second processing on the intermediate frequency signal.

In a possible implementation, the performing the second processing on the intermediate frequency signal, to determine a second detection result includes: performing two-dimensional Fourier transform on the intermediate frequency signal, to obtain a first data result; obtaining an amplitude or a power of the first data result based on the first data result; and comparing the amplitude of the first data result with a seventh threshold, or comparing the power of the first data result with an eighth threshold, to determine the second detection result.

In a possible implementation, the determining a state of the first frequency band based on the second detection result includes: if the amplitude of the first data result is greater than the seventh threshold, or the power of the first data result is greater than the eighth threshold, determining that the state of the first frequency band is a first state; or if the amplitude of the first data result is not greater than the seventh threshold, or the power of the first data result is not greater than the eighth threshold, determining that the state of the first frequency band is a second state.

In a possible implementation, the performing the second processing on the intermediate frequency signal, to determine a second detection result includes: performing two-dimensional Fourier transform on the intermediate frequency signal, to obtain a second data result; and comparing a quantity of third data results with a ninth threshold, or comparing a ratio of a quantity of third data results to a quantity of the second data results with a tenth threshold, to determine the second detection result, where the third data result is a data result whose amplitude is greater than an eleventh threshold in the second data results, or a data result whose power is greater than a twelfth threshold in the second data results.

In a possible implementation, the determining a state of the first frequency band based on the second detection result includes: if the quantity of the third data results is greater than the ninth threshold, or the ratio of the quantity of the third data results to the quantity of the second data results is greater than the tenth threshold, determining that the state of the first frequency band is a first state; or if the quantity of the third data results is not greater than the ninth threshold, or the ratio of the quantity of the third data results to the quantity of the second data results is not greater than the tenth threshold, determining that the state of the first frequency band is a second state.

In a possible implementation, the first state is a busy state, and the second state is an idle state.

According to a second aspect, an embodiment of this application provides another frequency band state determining method, applied to a detection apparatus. The method includes: receiving a radio frequency signal; determining an intermediate frequency signal based on an oscillation signal and the radio frequency signal, where the oscillation signal belongs to a first frequency band; performing first processing on the intermediate frequency signal, to determine a first detection result; performing second processing on the intermediate frequency signal, to determine a second detection result; and determining a state of the first frequency band based on the first detection result and the second detection result. By using this method, a frequency band state is determined by using a same threshold, so that in a use scenario of a cooperative radar, fairness in selecting resources can be balanced; in addition, the frequency band state can be determined with reference to an anti-interference capability of the detection apparatus, to increase resource utilization.

In a possible implementation, the performing first processing on the intermediate frequency signal, to determine a first detection result includes: performing intermediate frequency detection on the intermediate frequency signal, to determine an amplitude or a power of the intermediate frequency signal; and comparing the amplitude of the intermediate frequency signal with a first threshold, or comparing the power of the intermediate frequency signal with a second threshold, to determine the first detection result.

In a possible implementation, the performing first processing on the intermediate frequency signal, to determine a first detection result includes: sampling the intermediate frequency signal, to obtain a plurality of first sampling points; and comparing a quantity of second sampling points with a third threshold, or comparing a ratio of a quantity of second sampling points to a quantity of the plurality of first sampling points with a fourth threshold, to determine the first detection result, where the second sampling point is a sampling point whose amplitude is greater than a fifth threshold in the plurality of first sampling points, or a sampling point whose power is greater than a sixth threshold in the plurality of first sampling points.

In a possible implementation, the performing second processing on the intermediate frequency signal, to determine a second detection result includes: performing two-dimensional Fourier transform on the intermediate frequency signal, to obtain a first data result; obtaining an amplitude or a power of the first data result based on the first data result; and comparing the amplitude of the first data result with a seventh threshold, or comparing the power of the first data result with an eighth threshold, to determine the second detection result.

In a possible implementation, the performing second processing on the intermediate frequency signal, to determine a second detection result includes: performing two-dimensional Fourier transform on the intermediate frequency signal, to obtain a second data result; and comparing a quantity of third data results with a ninth threshold, or comparing a ratio of a quantity of third data results to a quantity of the second data results with a tenth threshold, to determine the second detection result, where the third data result is a data result whose amplitude is greater than an eleventh threshold in the second data results, or a data result whose power is greater than a twelfth threshold in the second data results.

In a possible implementation, the determining a state of the first frequency band based on the first detection result and the second detection result includes: if both the first detection result and the second detection result indicate that the first frequency band is busy, determining that the state of the first frequency band is a first state; or if both the first detection result and the second detection result do not indicate that the first frequency band is busy, determining that the state of the first frequency band is a second state.

In a possible implementation, the determining a state of the first frequency band based on the first detection result and the second detection result includes: if both the first detection result and the second detection result indicate that the first frequency band is idle, determining that the state of the first frequency band is a second state; or if both the first detection result and the second detection result do not indicate that the first frequency band is idle, determining that the state of the first frequency band is a first state.

In a possible implementation, the determining a state of the first frequency band based on the first detection result and the second detection result includes: if the first detection result indicates that the first frequency band is idle, determining that the state of the first frequency band is a third state; if the first detection result indicates that the first frequency band is busy, and the second detection result indicates that the first frequency band is busy, determining that the state of the first frequency band is a fourth state; or if the first detection result indicates that the first frequency band is busy, and the second detection result indicates that the first frequency band is idle, determining that the state of the first frequency band is a fifth state.

In a possible implementation, the determining a state of the first frequency band based on the first detection result and the second detection result includes: if the second detection result indicates that the first frequency band is idle, determining that the state of the first frequency band is a sixth state; if the second detection result indicates that the first frequency band is busy, and the first detection result indicates that the first frequency band is busy, determining that the state of the first frequency band is a seventh state;

or if the second detection result indicates that the first frequency band is busy, and the first detection result indicates that the first frequency band is idle, determining that the state of the first frequency band is an eighth state.

In a possible implementation, the determining a state of the first frequency band based on the first detection result and the second detection result includes: if both the first detection result and the second detection result indicate that the first frequency band is busy, determining that the state of the first frequency band is a ninth state; if the first detection result indicates that the first frequency band is busy, and the second detection result indicates that the first frequency band is idle, determining that the state of the first frequency band is a tenth state; if the first detection result indicates that the first frequency band is idle, and the second detection result indicates that the first frequency band is busy, determining that the state of the first frequency band is an eleventh state; or if both the first detection result and the second detection result indicate that the first frequency band is idle, determining that the state of the first frequency band is a twelfth state.

In a possible implementation, the first state is a busy state, and the second state is an idle state.

According to a third aspect, an embodiment of this application provides a detection apparatus. The detection apparatus includes a receiving unit, a first determining unit, a first processing unit, a second determining unit, a second processing unit, and a judgment unit. The receiving unit is configured to receive a radio frequency signal. The first determining unit is configured to determine an intermediate frequency signal based on an oscillation signal and the radio frequency signal, where the oscillation signal belongs to a first frequency band. The first processing unit is configured to perform first processing on the intermediate frequency signal, to determine a first detection result. The second determining unit is configured to determine, based on the first detection result, to perform second processing on the intermediate frequency signal. The second processing unit is configured to perform the second processing on the intermediate frequency signal, to determine a second detection result. The judgment unit is configured to determine a state of the first frequency band based on the second detection result. By using this detection apparatus, a frequency band state is determined by using a same threshold, so that in a use scenario of a cooperative radar, fairness in selecting resources can be balanced; in addition, the frequency band state can be determined with reference to an anti-interference capability of the detection apparatus, to increase resource utilization.

In a possible implementation, the first processing unit is specifically configured to: perform intermediate frequency detection on the intermediate frequency signal, to determine an amplitude or a power of the intermediate frequency signal; and compare the amplitude of the intermediate frequency signal with a first threshold, or compare the power of the intermediate frequency signal with a second threshold, to determine the first detection result.

In a possible implementation, the second determining unit is specifically configured to: if the amplitude of the intermediate frequency signal is greater than the first threshold, or the power of the intermediate frequency signal is greater than the second threshold, determine to perform the second processing on the intermediate frequency signal.

In a possible implementation, the first processing unit is specifically configured to: sample the intermediate frequency signal, to obtain a plurality of first sampling points; and compare a quantity of second sampling points with a third threshold, or compare a ratio of a quantity of second sampling points to a quantity of the plurality of first sampling points with a fourth threshold, to determine the first detection result, where the second sampling point is a sampling point whose amplitude is greater than a fifth threshold in the plurality of first sampling points, or a sampling point whose power is greater than a sixth threshold in the plurality of first sampling points.

In a possible implementation, the second determining unit is specifically configured to: if the quantity of the second sampling points is greater than the third threshold, or the ratio of the quantity of the second sampling points to the quantity of the plurality of first sampling points is greater than the fourth threshold, determine to perform the second processing on the intermediate frequency signal.

In a possible implementation, the second processing unit is specifically configured to: perform two-dimensional Fourier transform on the intermediate frequency signal, to obtain a first data result; obtain an amplitude or a power of the first data result based on the first data result; and compare the amplitude of the first data result with a seventh threshold, or compare the power of the first data result with an eighth threshold, to determine the second detection result.

In a possible implementation, the judgment unit is specifically configured to: if the amplitude of the first data result is greater than the seventh threshold, or the power of the first data result is greater than the eighth threshold, determine that the state of the first frequency band is a first state; or if the amplitude of the first data result is not greater than the seventh threshold, or the power of the first data result is not greater than the eighth threshold, determine that the state of the first frequency band is a second state.

In a possible implementation, the second processing unit is specifically configured to: perform two-dimensional Fourier transform on the intermediate frequency signal, to obtain a second data result; and compare a quantity of third data results with a ninth threshold, or compare a ratio of a quantity of third data results to a quantity of the second data results with a tenth threshold, to determine the second detection result, where the third data result is a data result whose amplitude is greater than an eleventh threshold in the second data results, or a data result whose power is greater than a twelfth threshold in the second data results.

In a possible implementation, the judgment unit is specifically configured to: if the quantity of the third data results is greater than the ninth threshold, or the ratio of the quantity of the third data results to the quantity of the second data results is greater than the tenth threshold, determine that the state of the first frequency band is a first state; or if the quantity of the third data results is not greater than the ninth threshold, or the ratio of the quantity of the third data results to the quantity of the second data results is not greater than the tenth threshold, determine that the state of the first frequency band is a second state.

In a possible implementation, the first state is a busy state, and the second state is an idle state.

According to a fourth aspect, an embodiment of this application provides a detection apparatus. The detection apparatus includes a receiving unit, a determining unit, a first processing unit, a second processing unit, and a judgment unit. The receiving unit is configured to receive a radio frequency signal. The determining unit is configured to determine an intermediate frequency signal based on an oscillation signal and the radio frequency signal, where the oscillation signal belongs to a first frequency band. The first processing unit is configured to perform first processing on the intermediate frequency signal, to determine a first detection result. The second processing unit is configured to perform second processing on the intermediate frequency signal, to determine a second detection result. The judgment unit is configured to determine a state of the first frequency band based on the first detection result and the second detection result. By using this detection apparatus, a frequency band state is determined by using a same threshold, so that in a use scenario of a cooperative radar, fairness in selecting resources can be balanced; in addition, the frequency band state can be determined with reference to an anti-interference capability of the detection apparatus, to increase resource utilization.

In a possible implementation, the first processing unit is specifically configured to: perform intermediate frequency detection on the intermediate frequency signal, to determine an amplitude or a power of the intermediate frequency signal; and compare the amplitude of the intermediate frequency signal with a first threshold, or compare the power of the intermediate frequency signal with a second threshold, to determine the first detection result.

In a possible implementation, the first processing unit is specifically configured to: sample the intermediate frequency signal, to obtain a plurality of first sampling points; and compare a quantity of second sampling points with a third threshold, or compare a ratio of a quantity of second sampling points to a quantity of the plurality of first sampling points with a fourth threshold, to determine the first detection result, where the second sampling point is a sampling point whose amplitude is greater than a fifth threshold in the plurality of first sampling points, or a sampling point whose power is greater than a sixth threshold in the plurality of first sampling points.

In a possible implementation, the second processing unit is specifically configured to: perform two-dimensional Fourier transform on the intermediate frequency signal, to obtain a first data result; obtain an amplitude or a power of the first data result based on the first data result; and compare the amplitude of the first data result with a seventh threshold, or compare the power of the first data result with an eighth threshold, to determine the second detection result.

In a possible implementation, the second processing unit is specifically configured to: perform two-dimensional Fourier transform on the intermediate frequency signal, to obtain a second data result; and compare a quantity of third data results with a ninth threshold, or compare a ratio of a quantity of third data results to a quantity of the second data results with a tenth threshold, to determine the second detection result, where the third data result is a data result whose amplitude is greater than an eleventh threshold in the second data results, or a data result whose power is greater than a twelfth threshold in the second data results.

In a possible implementation, the judgment unit is specifically configured to: if both the first detection result and the second detection result indicate that the first frequency band is busy, determine that the state of the first frequency band is a first state; or if both the first detection result and the second detection result do not indicate that the first frequency band is busy, determine that the state of the first frequency band is a second state.

In a possible implementation, the judgment unit is specifically configured to: if both the first detection result and the second detection result indicate that the first frequency band is idle, determine that the state of the first frequency band is a second state; or if both the first detection result and the second detection result do not indicate that the first frequency band is idle, determine that the state of the first frequency band is a first state.

In a possible implementation, the judgment unit is specifically configured to: if the first detection result indicates that the first frequency band is idle, determine that the state of the first frequency band is a third state; if the first detection result indicates that the first frequency band is busy, and the second detection result indicates that the first frequency band is busy, determine that the state of the first frequency band is a fourth state; or if the first detection result indicates that the first frequency band is busy, and the second detection result indicates that the first frequency band is idle, determine that the state of the first frequency band is a fifth state.

In a possible implementation, the judgment unit is specifically configured to: if the second detection result indicates that the first frequency band is idle, determine that the state of the first frequency band is a sixth state; if the second detection result indicates that the first frequency band is busy, and the first detection result indicates that the first frequency band is busy, determine that the state of the first frequency band is a seventh state; or if the second detection result indicates that the first frequency band is busy, and the first detection result indicates that the first frequency band is idle, determine that the state of the first frequency band is an eighth state.

In a possible implementation, the judgment unit is specifically configured to: if both the first detection result and the second detection result indicate that the first frequency band is busy, determine that the state of the first frequency band is a ninth state; if the first detection result indicates that the first frequency band is busy, and the second detection result indicates that the first frequency band is idle, determine that the state of the first frequency band is a tenth state; if the first detection result indicates that the first frequency band is idle, and the second detection result indicates that the first frequency band is busy, determine that the state of the first frequency band is an eleventh state; or if both the first detection result and the second detection result indicate that the first frequency band is idle, determine that the state of the first frequency band is a twelfth state.

In a possible implementation, the first state is a busy state, and the second state is an idle state.

According to a fifth aspect, an embodiment of this application provides a detection apparatus, including a processor and a memory. The memory is configured to store program instructions. The processor is configured to invoke the program instructions to perform the method according to any one of the first aspect or the possible implementations of the first aspect.

According to a sixth aspect, an embodiment of this application provides a detection apparatus, including a processor and a memory. The memory is configured to store program instructions. The processor is configured to invoke the program instructions to perform the method according to any one of the second aspect or the possible implementations of the second aspect.

According to a seventh aspect, an embodiment of this application provides a computer-readable storage medium. The computer-readable storage medium stores program instructions. When the program instructions are run by a computer, the computer performs the method according to any one of the first aspect or the possible implementations of the first aspect.

According to an eighth aspect, an embodiment of this application provides a computer-readable storage medium. The computer-readable storage medium stores program instructions, and when the program instructions are run by a computer, the computer performs the method according to any one of the second aspect or the possible implementations of the second aspect.

According to a ninth aspect, an embodiment of this application provides a computer program. When the computer program is run on a processor, the processor performs the method according to any one of the first aspect or the possible implementations of the first aspect, or performs the method according to any one of the second aspect or the possible implementations of the second aspect.

According to a tenth aspect, an embodiment of this application provides a chip. The chip is applied to a detection apparatus. The chip includes one or more interface circuits and one or more processors. The interface circuit is interconnected to the processor by using a line. The interface circuit is configured to: receive a signal from a memory of the detection apparatus, and send the signal to the processor. The signal includes a computer instruction stored in the memory. When the processor executes the computer instruction, the detection apparatus performs the method according to any one of the first aspect or the possible implementations of the first aspect, or performs the method according to any one of the second aspect or the possible implementations of the second aspect.

In this embodiment of this application, the detection apparatus determines an intermediate frequency signal based on a detected interfering signal in an environment and an oscillation signal that belongs to a first frequency band; the detection apparatus performs first processing on the intermediate frequency signal, to obtain a first detection result, and when the first detection result indicates that the first frequency band is busy, the detection apparatus then performs second processing on the intermediate frequency signal, to obtain a second detection result; and determines a state of the first frequency band based on the second detection result. By using the method in the embodiments of this application, a frequency band state is determined by using a same threshold, so that in a use scenario of a cooperative radar, fairness in selecting resources can be balanced; in addition, the frequency band state can be determined with reference to an anti-interference capability of a detection apparatus, to increase resource utilization.

BRIEF DESCRIPTION OF THE DRAWINGS

To describe the technical solutions in embodiments of this application or in the conventional technology more clearly, the following briefly describes the accompanying drawings required for describing embodiments or the conventional technology.

FIG. 2 is a schematic diagram of a linear frequency-modulated continuous wave according to an embodiment of this application;

DETAILED DESCRIPTION OF ILLUSTRATIVE EMBODIMENTS

Figure 1A:
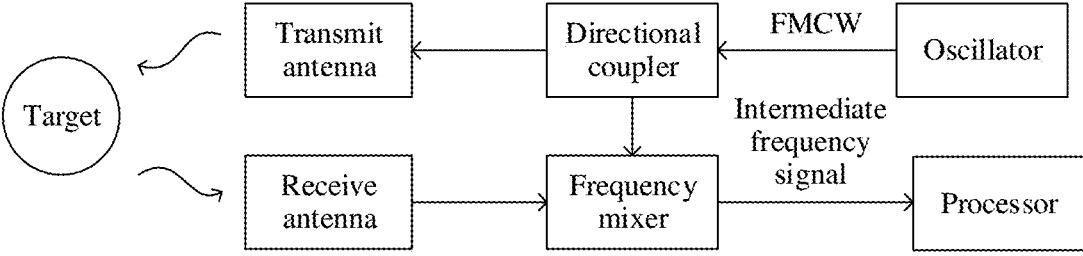
FIG. 1A is a diagram of a working principle of a millimeter-wave radar according to an embodiment of this application.

The following describes the technical solutions in embodiments of this application in more detail.

The following describes some terms in embodiments of this application to help a person skilled in the art have a better understanding.

(1) A detection apparatus, for example, is a radar (radar), or another apparatus used for detection (for example, distance detection).

(2) A radar may be also referred to as a radar apparatus, a detector, a radar detection apparatus, a radar signal sending apparatus, or the like. A working principle of the radar is that the radar sends a signal (or referred to as a detection signal) and receives a reflected signal reflected by a target object, to detect a corresponding target object. The signal sent by the radar may be a radar signal. Correspondingly, the received reflected signal reflected by the target object may be also a radar signal.

(3) A transmit period of a radar detection apparatus (or referred to as a frequency scanning period, a frequency scanning time, frequency scanning duration, or the like of the radar detection apparatus) is a period in which the radar detection apparatus sends a radar signal having a complete waveform. The radar detection apparatus usually sends a radar signal in a plurality of frequency scanning periods within consecutive duration.

(4) Initial frequency of a radar detection apparatus: At the beginning of a transmission period, the radar detection apparatus transmits a radar signal at a frequency, and this frequency is referred to as the initial frequency of the radar detection apparatus. In addition, a transmit frequency of some radar detection apparatuses changes in the transmit period based on the initial frequency. However, some radar detection apparatuses transmit the radar signal at a constant frequency, and a transmit frequency of the radar detection apparatuses does not change in the transmit period.

(5) A frequency scanning bandwidth of a radar detection apparatus is a bandwidth of a frequency band occupied by a waveform of a radar signal sent by the radar detection apparatus. It should be noted herein that the "frequency scanning bandwidth" is defined for ease of description, which may be also referred to as an operating bandwidth, and is technically the bandwidth occupied by the waveform of the radar signal sent by the radar detection apparatus. Further, a frequency band occupied by the waveform of the radar signal sent by the radar detection apparatus may be referred to as a frequency scanning band.

(6) A frequency-modulated continuous wave (frequency-modulated continuous wave, FMCW) is an electromagnetic wave whose frequency changes with time.

(7) A linear frequency-modulated continuous wave is an electromagnetic wave whose frequency changes linearly with time. The linear change herein generally refers to a linear change in one transmit period. Specifically, a waveform of the linear frequency-modulated continuous wave is generally a sawtooth wave or a triangular wave, or may be another possible waveform, for example, a linear frequency-modulated frequency step waveform.

(8) A maximum ranging distance of a radar detection apparatus, or referred to as a maximum detection distance of the radar detection apparatus, is a parameter related to configuration of the radar detection apparatus (for example, related to a factory setting parameter of the radar detection apparatus). For example, the radar detection apparatus is a radar, a maximum ranging distance of a long-range adaptive cruise control (ACC) radar is 250 m, and a maximum ranging distance of a medium-range radar is 70 m to 150 m.

(9) An intermediate frequency (IF) signal: For example, a radar detection apparatus is a radar. A local oscillator signal of the radar and a reflected signal (a signal obtained after a transmitted signal of the radar is reflected by a target object) received by the radar are processed by a frequency mixer, and then are processed by a low-pass filter, to obtain the intermediate frequency signal. Specifically, a part of a frequency-modulated continuous wave signal generated by an oscillator is used as a local oscillator signal, and another part of the frequency-modulated continuous wave signal is used as a transmitted signal and is transmitted through a transmit antenna. A reflected signal of the transmitted signal received by a receive antenna is mixed with the local oscillator signal, and the "intermediate frequency signal" is obtained. One or more pieces of location information, speed information, or angle information of the target object may be obtained by using the intermediate frequency signal. The location information may be location information of the target object relative to a current radar. The speed information may be speed information of the target object relative to the current radar. The angle information may be angle information of the target object relative to the current radar. Further, a frequency of the intermediate frequency signal is referred to as an intermediate frequency.

(10) "At least one" means one or more, and "a plurality of" means two or more. The term "and/or" describes an association relationship between associated objects and indicates that three relationships may exist. For example, A and/or B may represent that three relationships may exist: Only A exists, both A and B exist, and only B exists, where A and B may be singular or plural. The character "/" generally indicates an "or" relationship between associated objects. The term "at least one of the following items (pieces)" or a similar expression thereof means any combination of these items, including any combination of singular item (piece) or plural items (pieces). For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are used to distinguish between a plurality of objects, but are not intended to limit an order, a time sequence, priorities, or importance of the plurality of objects. For example, first information and second information are merely intended to distinguish between different information, but do not indicate that the two types of information are different in content, a priority, a sending sequence, importance, or the like.

In recent years, ADAS has played an important role in intelligent vehicles. The ADAS uses various sensors installed on the vehicle to sense an ambient environment, collect data, and identify, detect, and track static and moving objects during a driving process. The ADAS performs systematic calculation and analysis based on navigation map data. In this way, a driver can foresee possible danger in advance. This effectively improves driving comfort and safety. In short, real unmanned driving is a product of ultimate development of the ADAS. In an unmanned driving architecture, a sensing layer is paralleled to an "eye" of a vehicle, and includes a vision sensor, for example, a vehicle-mounted camera, and a radar sensor, for example, a vehicle-mounted millimeter-wave radar, a vehicle-mounted laser radar, or a vehicle-mounted ultrasonic radar. A millimeter-wave radar is the first to become a main sensor in an unmanned driving system due to low costs and a mature technology. Currently, the ADAS has developed more than 10 functions, including adaptive cruise, automatic emergency braking, lane change assistance, blind spot monitoring, and the like, which are inseparable from the vehicle-mounted millimeter-wave radar.

A millimeter wave is an electromagnetic wave whose wavelength ranges from 1 mm to 10 mm, and corresponds to a frequency range from 30 GHz to 300 GHz. In this frequency band, features related to the millimeter wave enable the millimeter wave to be very suitable for the vehicle-mounted field. High bandwidth means that there are abundant frequency domain resources and a low antenna side lobe, to facilitate imaging or quasi-imaging. A small wavelength means that a size of a radar device and an antenna diameter are reduced, and therefore a weight is reduced. A narrow beam means that, in the case of a same antenna size, a millimeter-wave beam is much narrower than a micrometer-wave beam, and therefore there is high radar resolution. Strong penetration means that, compared with a laser radar and an optical system, millimeter-wave radar has a better capability of penetrating smoke, dust, and fog, and can work around the clock.

A vehicle-mounted millimeter-wave radar system generally includes apparatuses such as an oscillator, a transmit antenna, a receive antenna, a frequency mixer, a processor, and a controller. FIG. 1A is a diagram of a working principle of a millimeter-wave radar. The oscillator generates a radar signal whose frequency increases linearly over time, and the radar signal is generally a frequency-modulated continuous wave. A part of the radar signal is output to the frequency mixer through a directional coupler and is used as a local oscillator signal, and another part of the radar signal is transmitted through the transmit antenna. The receive antenna receives a radar signal reflected after the transmitted radar signal encounters an object in front of a vehicle, and the frequency mixer mixes the received radar signal and the local oscillator signal, to obtain an intermediate frequency signal. The intermediate frequency signal includes information such as a distance, a speed, and an angle of a target object relative to the radar system. The intermediate frequency signal passes through a low-pass filter and undergoes amplification processing, and then is transmitted to the processor. The processor generally performs fast Fourier transform, spectrum analysis, and the like on the received signal, to obtain information about the distance, the speed, and the angle of the target object relative to the radar system. Finally, the processor may output the obtained information to the controller (not shown in the figure). The controller may be located outside the radar, to control a behavior of the vehicle. It should be noted herein that, with development of a technology, the controller may be also located outside the radar.

Figures 1, 1B:
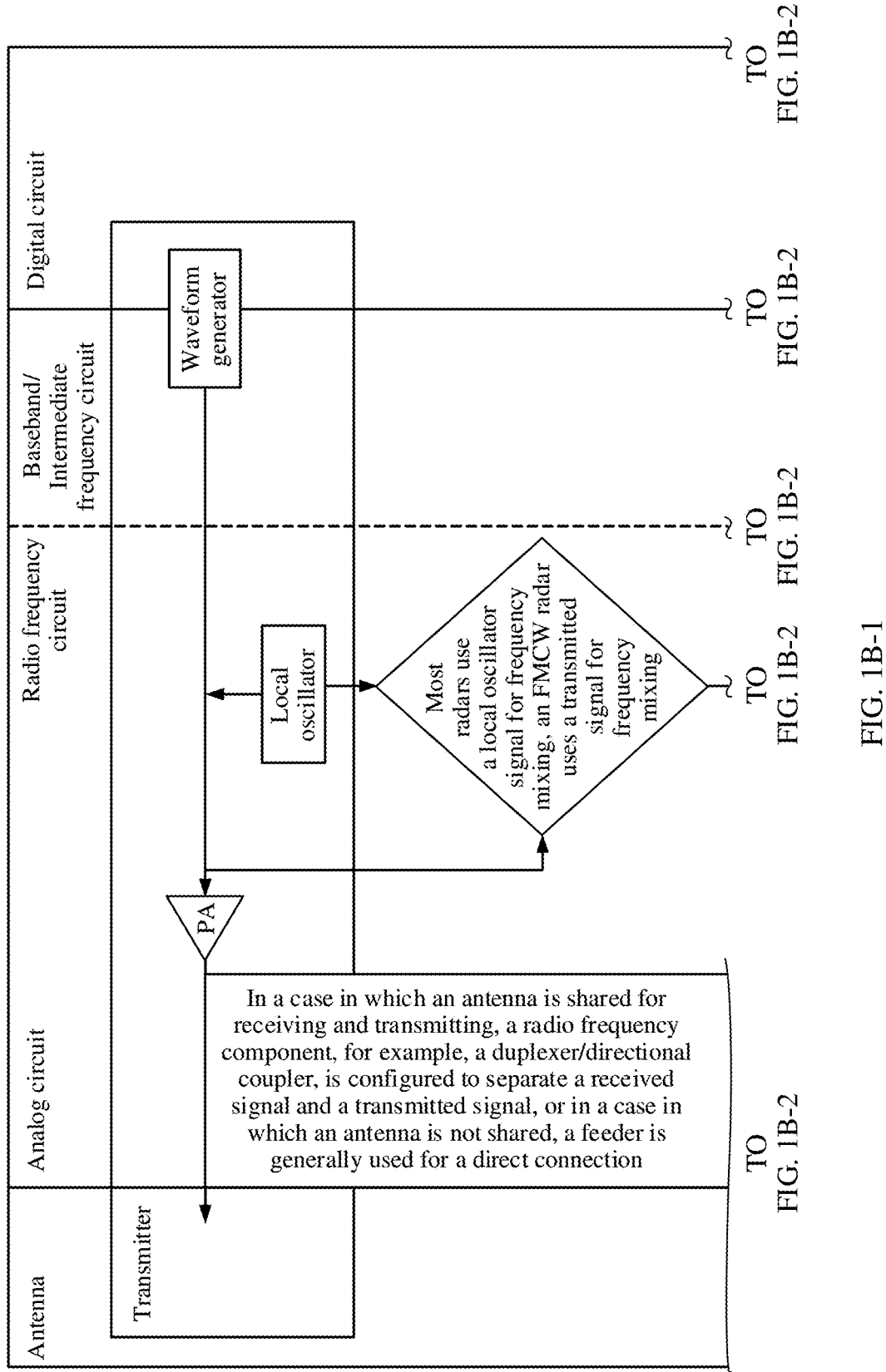
FIG. 1B-1 and FIG. 1B-2 are a diagram of a working principle of another millimeter-wave radar according to an embodiment of this application.

FIG. 1A provides only an example of the diagram of the working principle of the millimeter-wave radar. The diagram of the working principle of the millimeter-wave radar may also be shown in FIG. 1B-1 and FIG. 1B-2. This application provides examples of only two possible working principles of the radar. In actual application, the working principle of the radar may alternatively be in another form, and is not limited to the examples of the foregoing working principles.

A waveform of a frequency-modulated continuous wave of the millimeter-wave radar is generally a sawtooth wave or a triangular wave. The following uses the sawtooth wave as an example to describe in detail a ranging principle of the millimeter-wave radar. A ranging principle of the triangular wave is similar to a ranging principle of the sawtooth wave.

Figures 1, 1B, 2:
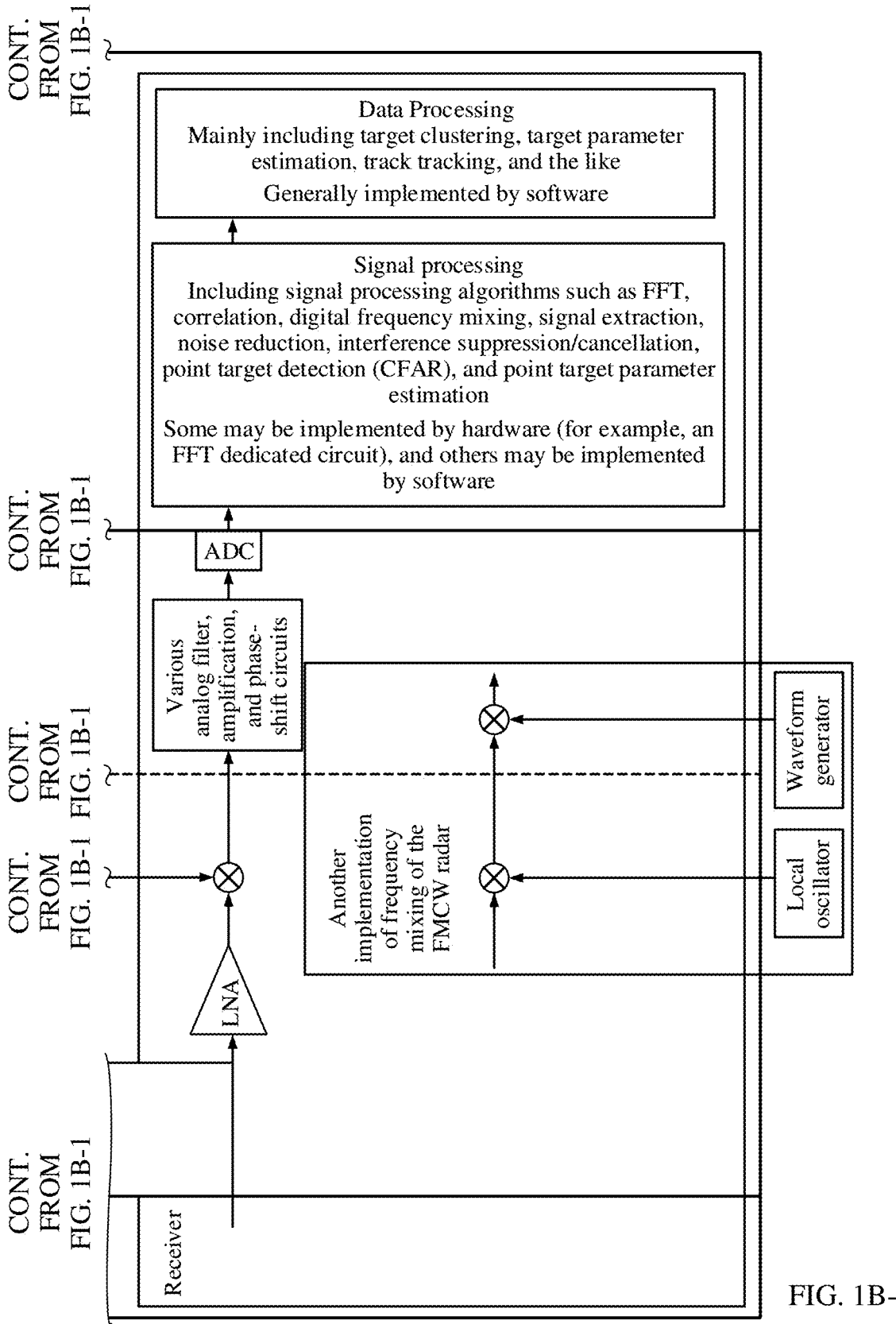
Figure 2:
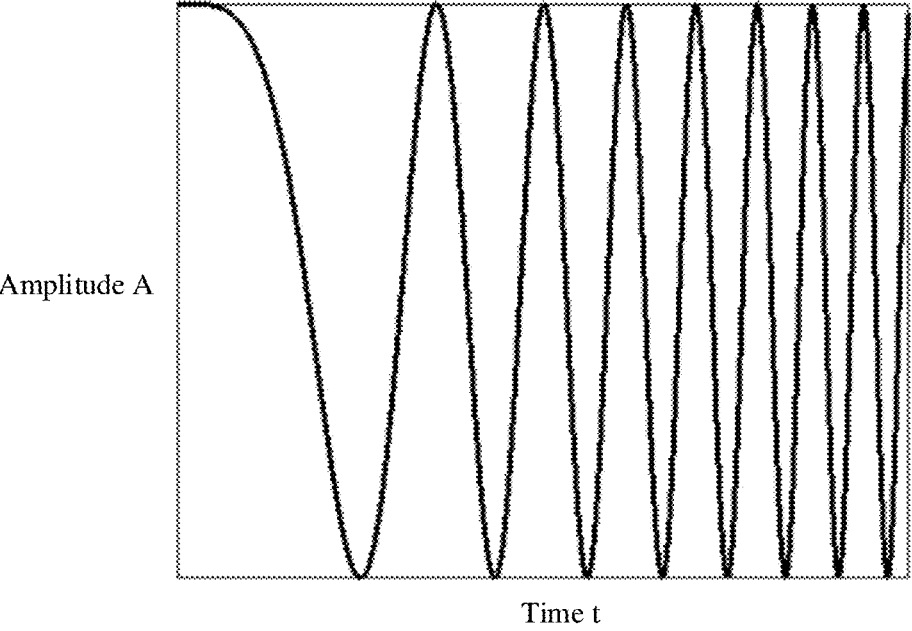
Figure 3:
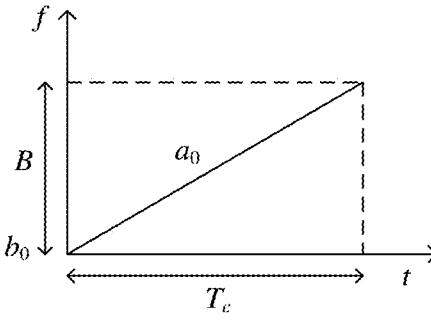
FIG. 3 is a schematic diagram of another linear frequency-modulated continuous wave according to an embodiment of this application.

As shown in FIG. 2, the linear frequency-modulated continuous wave is signal that linearly changes with time. As shown in FIG. 3, a period of the frequency-modulated continuous wave is $T_c$, a slope is $a_0$, a bandwidth is B, and a start frequency of the frequency-modulated continuous wave is $b_0$. The frequency-modulated continuous wave signal shown in FIG. 2 is also referred to as a chirp (chirp) signal.

An equivalent baseband signal of a single-period frequency-modulated continuous wave that is output by the oscillator of the millimeter-wave radar may be expressed as follows:

$$S_{BB}^T(t) = A\exp\left\{j2\pi\left[\frac{a_0}{2}t^2 + b_0t + \varphi_0\right]\right\}, 0 \le t \le T_c \qquad \text{(formula 1.1)}$$

A represents an amplitude of the equivalent baseband signal, $a_0$ represents a slope of the equivalent baseband signal, $b_0$ represents an intercept of the equivalent baseband signal on a Y axis, $\varphi_0$ represents an initial phase of the equivalent baseband signal, and exp represents an exponential function of e. The frequency is defined as a change rate of a phase relative to time. Therefore, a frequency of the equivalent baseband signal is as follows:

$$f = \frac{d\left(\frac{a_0}{2}t^2 + b_0t + \varphi_0\right)}{dt} = a_0t + b_0, 0 \le t \le T_c \qquad \text{(formula 1.2)}$$

An image of formula 1.2 is shown in FIG. 3.

After up-conversion, the equivalent baseband signal sent by the oscillator is radiated outward by the transmit antenna of the millimeter-wave radar. A transmitted signal may be expressed as follows:

$$S_{RF}^T(t) = A\exp\left\{j2\pi\left[\frac{a_0}{2}t^2 + b_0t + \varphi_0\right]\right\}\exp(j2\pi f_c t) \qquad \text{(formula 1.3)}$$

$$= A\exp\left\{j2\pi\left[\frac{a_0}{2}t^2 + (b_0 + f_c)t + \varphi_0\right]\right\}, 0 \le t \le T_c$$

Figures 4, 5:
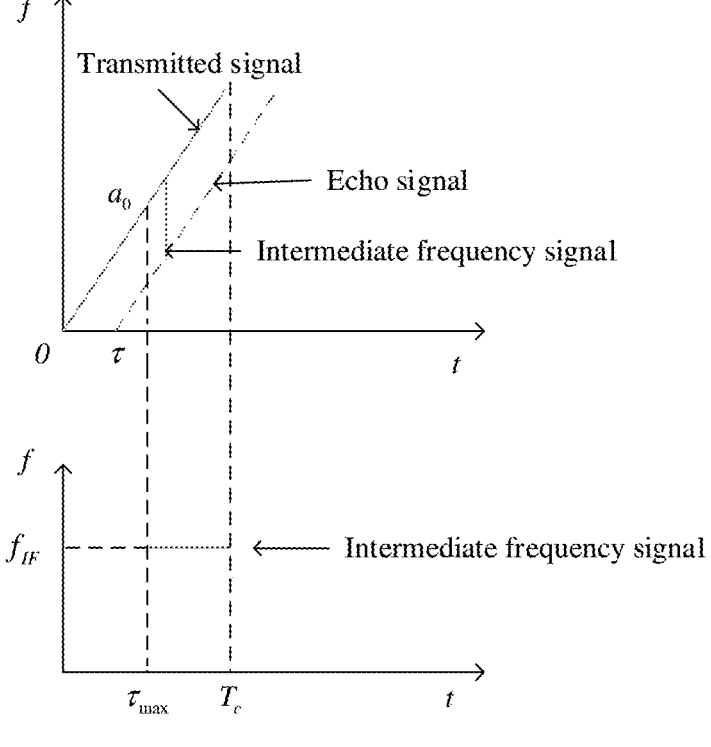
FIG. 4 is a schematic diagram of a transmitted signal and a reflected signal according to an embodiment of this application.
FIG. 5 is a schematic diagram of mutual interference between vehicle-mounted radars according to an embodiment of this application.

After the signal encounters an obstacle, the signal is reflected and then received by the millimeter-wave radar. A waveform of the transmitted signal is the same as that of a reflected signal, except that the waveform of the reflected signal has a delay $\tau$ relative to the waveform of the transmitted signal, as shown in FIG. 4. In FIG. 4, an echo signal is the reflected signal. The received reflected signal may be expressed as follows:

$$S_{RF}^R(t - \tau) = A'\exp\left\{j2\pi\left[\frac{a_0}{2}(t - \tau)^2 + (b_0 + f_c)(t - \tau) + \varphi_0\right]\right\}, \qquad \text{(formula 1.4)}$$

$$0 \le t \le T_c$$

A signal obtained after down-conversion is performed on the received equivalent baseband signal is as follows:

$$S_{BB}^R(t - \tau) = A'\exp\left\{j2\pi\left[\frac{a_0}{2}(t - \tau)^2 + b_0(t - \tau) - f_c\tau + \varphi_0\right]\right\}, \qquad \text{(formula 1.5)}$$

$$0 \le t \le T_c$$

A' represents an amplitude of a signal obtained after the equivalent baseband signal transmitted by the oscillator undergoes a transmit antenna gain, target reflection, a propagation loss, and a receive antenna gain, $\tau$ represents a delay between a moment at which a transmitter of the millimeter-wave radar sends the radar signal and a moment at which a receiver of the millimeter-wave radar receives the echo signal (namely, the reflected signal), as shown in FIG. 4, and the delay is two times of a distance divided by a speed of light. In addition, in FIG. 4, $\tau_{max}$ represents an echo delay corresponding to a maximum detection distance of the millimeter-wave radar. In other words, $\tau_{max}$ is a delay of the reflected signal received by the millimeter-wave radar relative to the transmitted signal when a distance between the millimeter-wave radar and a target object is a maximum distance that can be detected by the millimeter-wave radar. A relationship between $\tau$ and a target distance d may be expressed as:

$$\tau = \frac{2d}{c} \qquad \text{(formula 1.6)}$$

c represents the speed of light.

The frequency mixer of the millimeter-wave radar performs frequency mixing on the received signal and the local oscillator signal, and outputs an intermediate frequency signal after processing by the low-pass filter. The intermediate frequency signal is represented as follows:

$$S_{IF}(t) = S_{BB}^T(t) \times \left[ S_{BB}^R(t-\tau) \right] * =$$
$$AA' \exp(j2\pi f_c \tau) \exp\left[ -j2\pi\left( \frac{a_0}{2}\tau^2 - b_0\tau \right) \right] \exp[j2\pi(a_0\tau t)], \qquad \text{(formula 1.7)}$$
$$\tau \le t \le T_c$$

The intermediate frequency signal is delivered to a processor of the millimeter-wave radar for processing such as fast Fourier transform, to obtain a frequency $f_{IF}$ of the intermediate frequency signal.

In addition, as shown in FIG. 4, the frequency of the intermediate frequency signal is a product of a slope of the waveform of the transmitted signal and the delay $\tau$, that is:

$$f_{IF} = a_0 \cdot \tau = \frac{B}{T_C} \cdot \frac{2d}{c} = \frac{2d}{c \cdot T_C} B \qquad \text{(formula 1.8)}$$

Therefore, the distance d between the millimeter-wave radar and the target object is:

$$d = \frac{c \cdot T_C}{2B} f_{IF} \qquad \text{(formula 1.9)}$$

It can be learned from the foregoing deduction process that there is a linear relationship between a delay and a frequency difference (namely, the frequency of the intermediate frequency signal) between the transmitted signal and the received signal: A longer distance of the target object indicates a later time of receiving the reflected signal, and therefore indicates a larger frequency difference between the reflected signal and the transmitted signal. Therefore, the distance between the radar and the target object may be determined by determining the frequency of the intermediate frequency signal.

For speed detection, it can be learned from (formula 1.7) that, a phase difference between echo intermediate frequency signals of two adjacent periods at a same time sampling point is a constant value:

$$\Delta\Phi = \Phi_{n+1} - \Phi_n = 2\pi f_d^0 T_c \qquad \text{(formula 1.10)}$$

When Fourier transform is performed on a phase sequence of echo intermediate frequency signals of a plurality of successive periods at a same time sampling point, a Doppler frequency $f_d$ can be obtained, and a relationship between the Doppler frequency and a target radial relative speed v may be expressed as:

$$f_d^0 = (f_c + b_0)\frac{2v}{c} = \frac{2v}{\lambda} \qquad \text{(formula 1.11)}$$

$\lambda$ is a wavelength of the radar signal.

Therefore, the radial relative speed v between the radar and the target is:

$$v = \frac{\lambda f_d^0}{2} \qquad \text{(formula 1.12)}$$

The foregoing process of processing on the radar signal is merely an example, and a specific radar processing process is not limited. As more vehicle-mounted radars are used, mutual interference between the vehicle-mounted radars becomes more severe. Consequently, a radar detection probability is greatly reduced or a false alarm probability of radar detection is increased, posing a non-negligible impact on driving safety or comfort.

FIG. 5 is a schematic diagram of the mutual interference between the vehicle-mounted radars. A radar 1 sends a transmitted signal, and receives a reflected signal obtained after the transmitted signal is reflected by a target object. When the radar 1 receives the reflected signal, a receive antenna of the radar 1 also receives a transmitted signal or a reflected signal of a radar 2. In this case, the transmitted signal of the radar 2 or the reflected signal of the radar 2 that is received by the radar 1 is an interfering signal for the radar 1.

For example, it is assumed that the radar 1 is an observation radar, a slope of a frequency-modulated continuous wave of the radar 1 is $a_0$, an intercept is $b_0$, and a period is $T_c$. The radar 2 is an interfering radar, a slope of a frequency-modulated continuous wave of the radar 2 is $a_1$, and an intercept is $b_1$. In this case, it is assumed that $b_0 = b_1$. An echo delay corresponding to a maximum detection distance of the radar 1 is $\tau_{max}$ (namely, a delay obtained by calculated by substituting the maximum detection distance of the radar into formula 1.6; for example, the maximum detection distance of the radar is 250 m, and the delay calculated by substituting the maximum detection distance into formula 1.6 is 1.67 μs), and a delay of an interfering signal of the radar 2 that reaches a receiver of the radar 1 is $\tau_1$. It is considered that a timing error existing at a radar transmit moment is $\Delta\tau$ (for example, a transmit moment error generated due to a timing error of a global positioning system (global positioning system, GPS), for example, 60 ns). A time interval in which the radar detects a received signal is $\tau_{max}$ to $T_c$.

Figure 6:
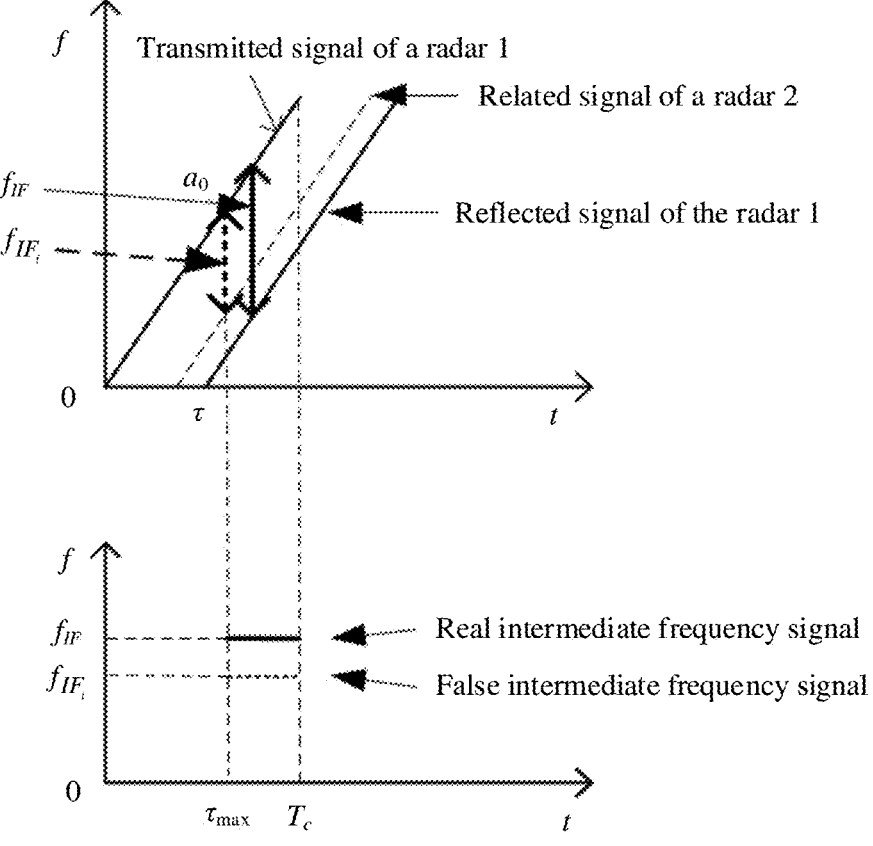
FIG. 6 is a schematic diagram of a possible false intermediate frequency signal according to an embodiment of this application.
Figure 7:
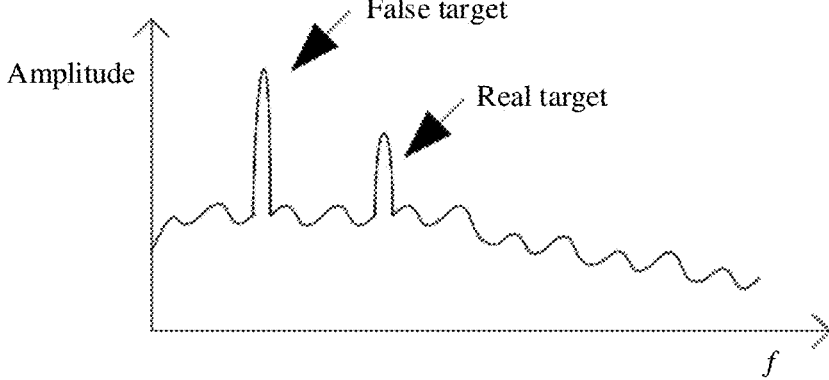
FIG. 7 is a schematic diagram of another possible false intermediate frequency signal according to an embodiment of this application.

FIG. 6 and FIG. 7 are schematic diagrams of a possible false intermediate frequency signal. If a slope of a radar signal sent by the radar 1 is consistent with a slope of a radar signal sent by the radar 2, that is, $a_0 = a_1$, and operating frequency bands of the two radar signals overlap, a false alarm occurs. As shown in FIG. 6, the radar 1 transmits a signal to a target object, and receives a reflected signal from the target object. However, in a time range between a moment at which the radar 1 transmits the signal and a moment at which the radar 1 receives the reflected signal, a receive antenna of the radar 1 receives a transmitted signal or a reflected signal (a dashed line) of the radar 2. A signal waveform of the radar 1 is consistent with a signal waveform of the radar 2, and frequency scanning bandwidths of the two radars are the same. Within a target echo observation range of the radar 1, the radar 1 receives the signal (shown by the dashed line) of a corresponding frequency. In this case, the radar 1 considers that a "target object 1" exists. The radar 1 detects the signal shown by the dashed line and a reflected signal shown by a solid line within a time interval $(\tau_{max}$ to $T_c)$ for signal processing. In this case, the radar 1 mistakenly considers the received signal shown by the dashed line as the reflected signal of the object existing ahead. In this case, a false intermediate frequency signal is generated. The radar 1 may find two peaks through spectrum analysis after performing fast Fourier transform. As shown in FIG. 7, each peak corresponds to one target object. The radar 1 considers that the "target object 1" and a "target object 2" exist simultaneously. The radar 1 mistakenly considers that the "target object 1" exists ahead. Actually, the "target object 1" does not exist. This is referred to as a "ghost" or a "false alarm". After the false alarm occurs, an autonomous vehicle slows down or brakes suddenly when there is no object in front. Consequently, driving comfort is reduced.

Figures 8, 9:
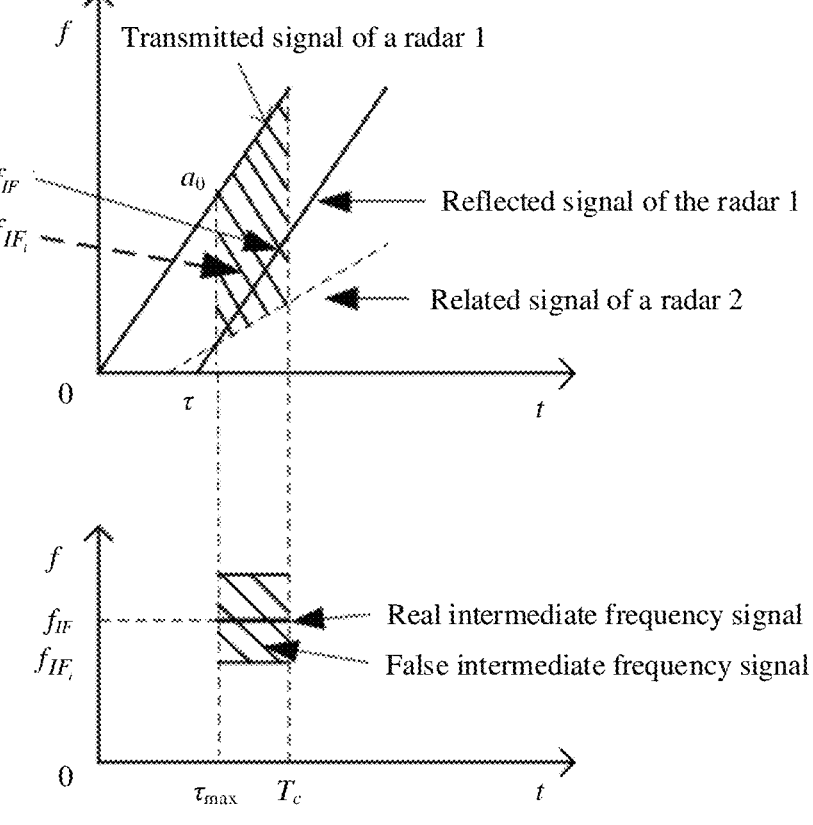
FIG. 8 is a schematic diagram showing that a possible interfering signal drowns a target signal according to an embodiment of this application.
FIG. 9 is a schematic diagram showing that another possible interfering signal drowns a target signal according to an embodiment of this application.

FIG. 8 and FIG. 9 are schematic diagrams showing that a possible interfering signal drowns a target signal. As shown in FIG. 8, the radar 1 transmits a signal to a target object, and receives a reflected signal from the target object. However, within a target echo observation range of the radar 1, the receive antenna of the radar 1 receives a transmitted signal or a reflected signal (a dashed line) of the radar 2. A signal waveform of the radar 1 differs from a signal waveform of the radar 2 in slope. The radar 1 simultaneously detects the reflected signal of the radar 1 and a related signal of the radar 2 in a time interval $(\tau_{max}$ to $T_c)$ for signal detection. After the detected related signal of the radar 2 is mixed with the reflected signal of the radar 1, an intermediate frequency signal including various frequency components is generated. After fast Fourier transform is performed, as shown in FIG. 9, an interference-induced floor occurs. Consequently, the real target object does not "protrude" enough, detection is difficult, and a possibility of missing detection is increased. After missing detection occurs, when there is an object in front of an autonomous vehicle, the autonomous vehicle mistakenly considers that there is no object, and does not decelerate or brake. Consequently, a traffic accident is caused, and vehicle driving safety is reduced.

Figure 10:
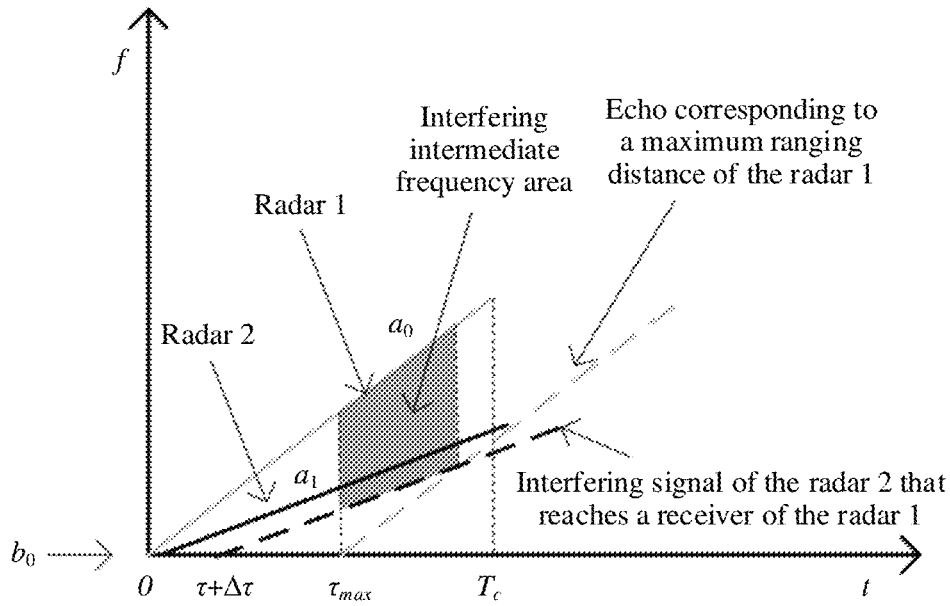
FIG. 10 is a schematic diagram of an interference case according to an embodiment of this application.

Specifically, the signal waveform of the radar 1 differs from the signal waveform of the radar 2 in slope. Assuming that a waveform slope of the radar 1 is $a_0$, and a waveform slope of the radar 2 is $a_1$, a difference between the two slopes may be classified into the following two cases:

When $a_1 < a_0$, as shown in FIG. 10, an interference-induced floor problem occurs, causing a missing detection problem.

Figure 11:
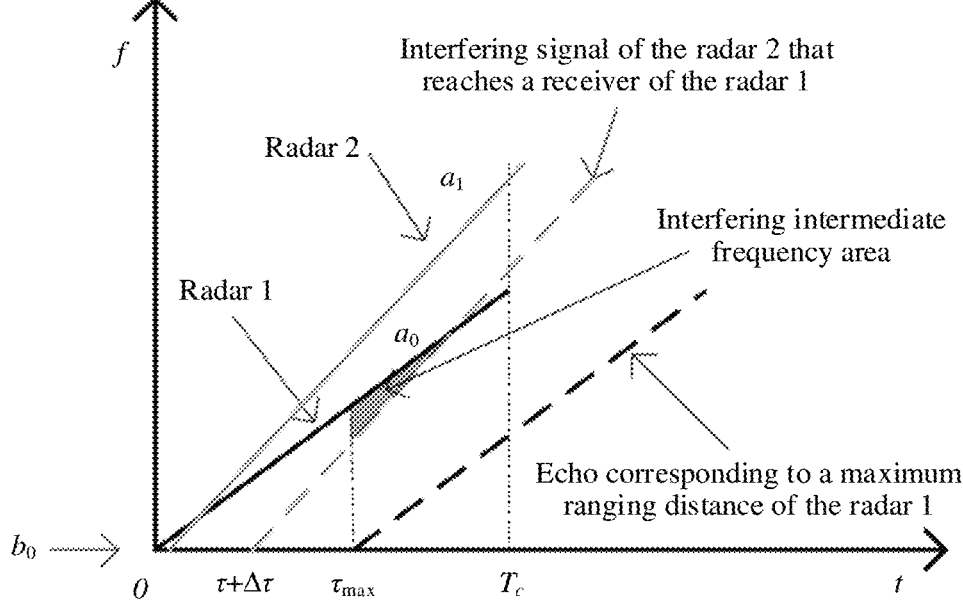
FIG. 11 is a schematic diagram of another interference case according to an embodiment of this application.

When $a_1 > a_0$, as shown in FIG. 11, an interference-induced floor problem also occurs, causing a missing detection problem.

It should be noted that, a person skilled in the art may understand that a signal received at a moment or in a period of time may be an interfering signal, or may be a reflected signal of a target object. A radar detection status can be clearly indicated by changes in time and a frequency of a transmitted/reflected signal. Therefore, in subsequent descriptions of embodiments of this application, a curve chart indicating a slope (a frequency range within a specific period of time) of the transmitted/reflected signal is mostly used to indicate the mutual interference between the radars.

If a radar detection probability decreases, or a false alarm probability of radar detection increases, non-negligible impact is caused to driving safety or comfort. Therefore, how to reduce the interference between the vehicle-mounted radars is a problem that needs to be resolved.

Figure 12:
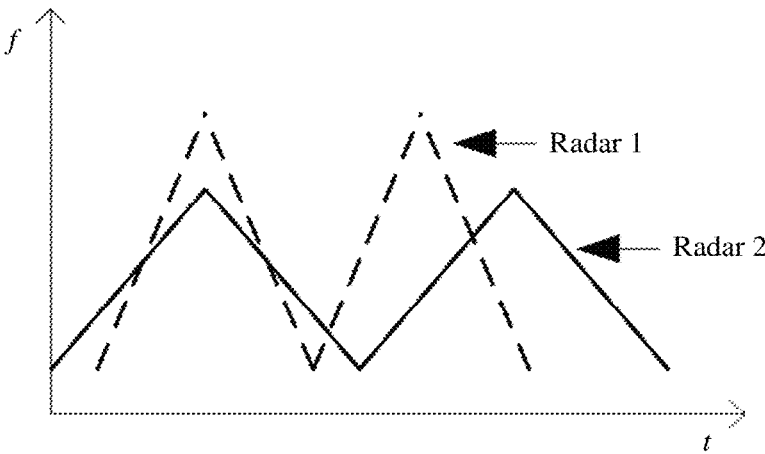
FIG. 12 is a schematic diagram of a possible solution according to an embodiment of this application.
Figure 13:
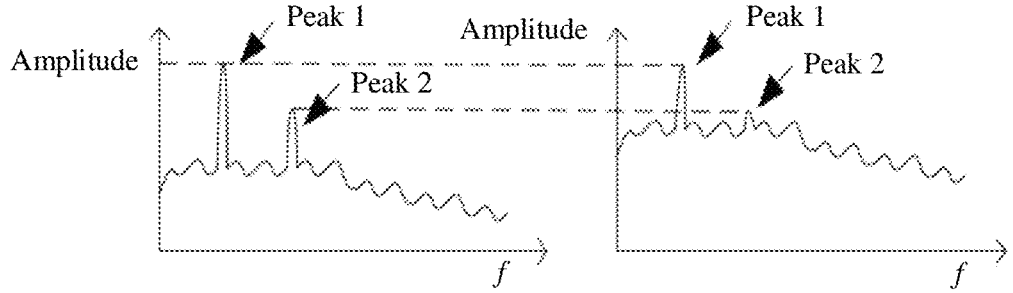
FIG. 13 is a schematic diagram of a possible missing detection result according to an embodiment of this application.

To resolve the foregoing problem, in a possible solution, different parameters such as a waveform slope and a period may be set for different radars. FIG. 12 is a schematic diagram of a possible solution. As shown in FIG. 12, parameters such as a slope and a transmit period of a signal of the radar 1 are inconsistent with those of the radar 2. In this way, even if the radar 1 receives a signal of the radar 2, because the waveforms of the signals of the radar 1 and the radar 2 are inconsistent, when the signals pass through the frequency mixer, namely, when there is a difference between the frequencies, an intermediate frequency signal with a constant frequency is not generated. Only the intermediate frequency signal with the constant frequency is represented as a peak signal in the spectrum analysis. Therefore, this method can reduce a ghost probability. However, if the radar 1 receives the signal of the radar 2, and an interfering signal falls within an effective received intermediate frequency bandwidth after processing is performed by the frequency mixer, strength of the interfering signal is increased. After an interfering signal level is increased, the original target signal is overwhelmed due to interference, as shown in FIG. 13. FIG. 13 is a schematic diagram of a possible missing detection result. A consequence is that an obstacle exists ahead of a vehicle but is not detected. As a result, missing detection occurs. This causes bad impact to safety of vehicle traveling, in particular, safety of an unmanned vehicle.

In another possible solution, a vehicle-mounted radar listens to a radio frequency signal in an environment, and determines, through threshold detection, interference caused to an operating frequency band of the radar. However, in a conventional technology, because different manufacturers have different thresholds, threshold detection on a radio frequency signal in a same environment has different results. This may cause inconsistent performance of radars from different manufacturers in selecting operating frequency bands.

In view of this, the technical solutions in embodiments of this application are provided. In the embodiments of this application, before transmitting a radar signal, a detection apparatus listens to a radar signal in an ambient environment to determine states of optional scanning frequency bands, and then select an appropriate frequency band from the optional scanning frequency bands based on the states of the scanning frequency bands as an operating frequency band. By using a frequency band state determining manner provided in this application, understanding of states of optional scanning frequency bands can be standardized and unified, to further unify performance of various radar detection apparatuses in selecting operating frequency bands, and increase resource utilization of transmit frequency bands of radars, thereby reducing or avoiding interference between the radar detection apparatuses.

Figure 14:
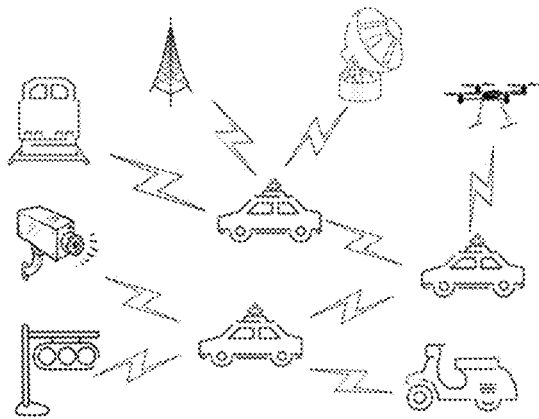
FIG. 14 is a schematic diagram of a possible application scenario according to an embodiment of this application.

FIG. 14 is a schematic diagram of a possible application scenario according to an embodiment of this application. The foregoing application scenario may be unmanned driving, autonomous driving, intelligent driving, networked driving, or the like. A radar detection apparatus may be installed on a motor vehicle (for example, an unmanned vehicle, an intelligent vehicle, an electric vehicle, or a digital-based vehicle), an unmanned aerial vehicle, a railcar, a bicycle, a signal light, a speed measurement apparatus or a network device (for example, a base station or a terminal device in various systems), or the like. This embodiment of this application is applicable not only to a radar detection apparatus between vehicles, but also to a radar detection apparatus between the vehicle and another apparatus, for example, the unmanned aerial vehicle, or a radar detection apparatus between other apparatuses. In addition, the radar detection apparatus may be installed on a mobile device. For example, the radar detection apparatus is installed on a vehicle as a vehicle-mounted radar detection apparatus. The radar detection apparatus may be alternatively installed on a fixed device, for example, installed on a device, for example, a road side unit (RSU). An installation position, a function, and the like of the radar detection apparatus are not limited in this embodiment of this application.

Figure 15:
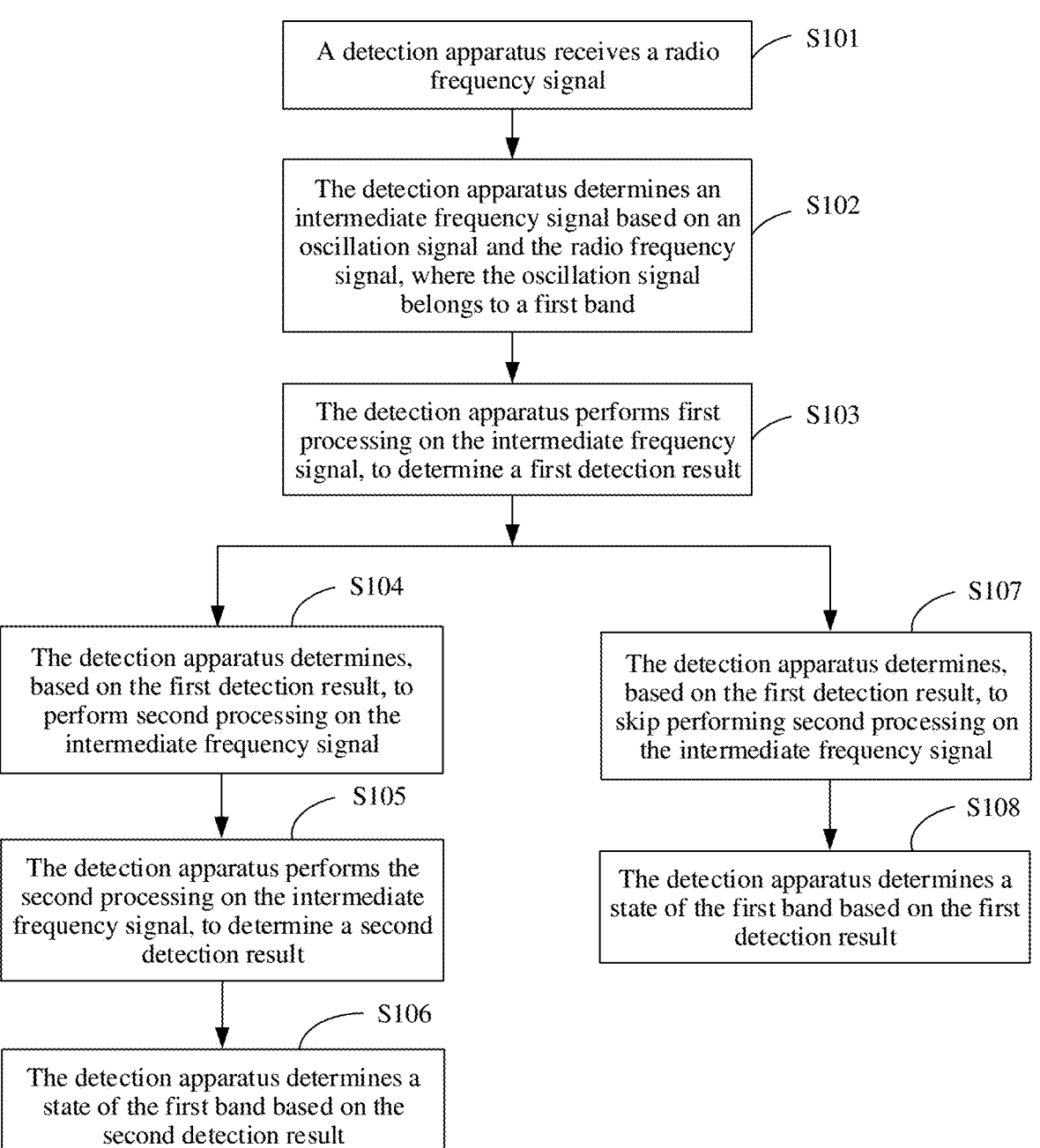
FIG. 15 is a flowchart of a frequency band state determining method according to an embodiment of this application.

In addition, the signal sent by the radar detection apparatus may be a radio signal, and the radio signal may be considered as a radar signal. In this embodiment of this application, an example in which the detection apparatus is the radar detection apparatus and the signal sent by the radar detection apparatus is a radar signal is used. The following describes a frequency band state determining method provided in an embodiment of this application. The method is applied to a detection apparatus. FIG. 15 is a flowchart of the frequency band state determining method according to an embodiment of this application. The method includes the following steps:

S101: The detection apparatus receives a radio frequency signal.

Specifically, the radio frequency signal is a radio frequency signal existing in an ambient environment in which the detection apparatus is located. The radio frequency signal may include a radar transmitted signal sent by another detection apparatus, or a reflected signal of a radar transmitted signal sent by another detection apparatus. For example, for the radio frequency signal, refer to the interfering signal shown in FIG. 5.

In some embodiments, the detection apparatus may receive, in a first idle time period of a refresh period of the radar of the detection apparatus, the radio frequency signal existing in the ambient environment. Optionally, the detection apparatus transmits, in one refresh period, radar signals of a plurality of periods, and transmits a radar signal of a next refresh period after the first idle time period. One refresh period may include an active time period and an idle time period. The active time period is used to send and receive radar signals. For example, one refresh period of a radar signal occupies a total of 50 ms. The active time period occupies 10 ms, and the idle time period occupies 40 ms. Then, the 40 ms idle time period may be referred to as a first idle time period.

In some other embodiments, the detection apparatus may select one refresh period in a plurality of successive refresh periods, to receive the radio frequency signal existing in the ambient environment. No radar signal is sent in the selected refresh period anymore.

Figure 16:
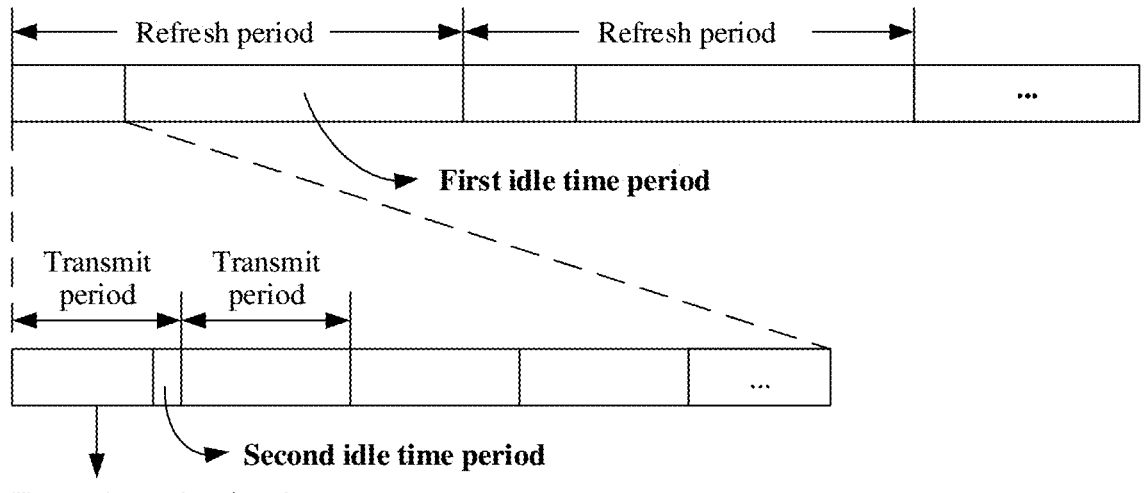
FIG. 16 is a schematic diagram of a first idle time period and a second idle time period according to an embodiment of this application.

In some other embodiments, the detection apparatus may receive, in a second idle time period of a transmit period of the radar of the detection apparatus, the radio frequency signal existing in the ambient environment. Optionally, the detection apparatus transmits, in one transmit period of the radar signal, a radar signal whose transmit time is preset, and transmits a radar signal of a next transmit period after the second idle time period. For example, one transmit period of a radar signal may be 12 μs, and one transmit period includes a 10 μs radar transmit time and a 2 μs idle time. Then, the 2 μs idle time may be referred to as a second idle time period. FIG. 16 is a schematic diagram of a first idle time period and a second idle time period according to an embodiment of this application.

S102: The detection apparatus determines an intermediate frequency signal based on an oscillation signal and the radio frequency signal, where the oscillation signal belongs to a first frequency band.

In some embodiments, the detection apparatus mixes the local oscillator signal with the received radio frequency signal, and obtains the intermediate frequency signal after the mixed signals pass through a low-pass filter. The oscillation signal belongs to the first frequency band. The first frequency band may be a frequency band in a plurality of optional frequency bands. For example, a range of the plurality of optional frequency bands of the oscillation signal may be 77 GHz to 78 GHz, and by using 200 MHz as a division unit, five optional frequency bands can be obtained through division. The first frequency band may be a frequency band in the five optional frequency bands.

S103: The detection apparatus performs first processing on the intermediate frequency signal, to determine a first detection result.

In some embodiments, a manner of performing the first processing on the intermediate frequency signal, to determine the first detection result may be: performing intermediate frequency detection on the intermediate frequency signal, to determine an amplitude or a power of the intermediate frequency signal; and comparing the amplitude of the intermediate frequency signal with a first threshold, or comparing the power of the intermediate frequency signal with a second threshold, to determine the first detection result.

Optionally, a manner of performing intermediate frequency detection on the intermediate frequency signal may be: the detection apparatus samples the intermediate frequency signal to obtain a plurality of sampling points. Then, the detection apparatus may obtain the amplitude or the power of the intermediate frequency signal based on the plurality of sampling points. The first detection result may indicate a size relationship between the amplitude of the intermediate frequency signal and the first threshold, or indicate a size relationship between the power of the intermediate frequency signal and the second threshold.

Optionally, if the amplitude of the intermediate frequency signal is greater than the first threshold, or the power of the intermediate frequency signal is greater than the second threshold, the first detection result indicates that the first frequency band is busy. If the amplitude of the intermediate frequency signal is not greater than the first threshold, or the power of the intermediate frequency signal is not greater than the second threshold, the first detection result indicates that the first frequency band is idle.

In addition, in a specific implementation, a manner of processing a critical value may change. For example, in some embodiments, if the amplitude of the intermediate frequency signal is not less than the first threshold, or the power of the intermediate frequency signal is not less than the second threshold, the first detection result indicates that the first frequency band is busy. If the amplitude of the intermediate frequency signal is less than the first threshold, or the power of the intermediate frequency signal is less than the second threshold, the first detection result indicates that the first frequency band is idle.

Optionally, the amplitude of the intermediate frequency signal may be an average value, a maximum value, a median value, or the like of amplitude values of the plurality of the sampling points. The power of the intermediate frequency signal may be an average value, a maximum value, a median value, or the like of power values of the plurality of the sampling points. Optionally, the first threshold or the second threshold may be a value preconfigured in the detection apparatus. Alternatively, the first threshold or the second threshold may be a value predefined in a standard. For example, the second threshold may be a sum of receiver sensitivity (for example, −120 dBm), a demodulation signal to noise ratio (signal to noise ratio, SNR) (for example, 10 dB), and a margin (for example, 5 dB) of the detection apparatus, namely, −105 dBm. It should be noted that, the value of the second threshold is merely an example herein. In actual application, the second threshold may alternatively be another value. Similarly, there may also be a plurality of manners of determining the value of the first threshold. In some embodiments, first thresholds in a plurality of detection apparatuses may be the same, or second thresholds in a plurality of detection apparatuses may be the same. In this manner, first detection results obtained by various detection apparatuses based on a same radio frequency signal and a same oscillation signal are the same, and fairness in selecting resources can be balanced. In addition, an anti-interference capability of the detection apparatuses can be fully utilized, to increase utilization of a frequency band.

In some other embodiments, a manner of performing first processing on the intermediate frequency signal, to determine the first detection result may be: sampling the intermediate frequency signal, to obtain a plurality of first sampling points; and comparing a quantity of second sampling points with a third threshold, or comparing a ratio of a quantity of second sampling points to a quantity of the plurality of first sampling points with a fourth threshold, to determine the first detection result. The second sampling point is a sampling point whose amplitude is greater than a fifth threshold in the plurality of first sampling points, or a sampling point whose power is greater than a sixth threshold in the plurality of first sampling points. The first detection result may indicate a size relationship between the quantity of the second sampling points and the third threshold, or indicate a size relationship between the ratio of the quantity of the second sampling points to the quantity of the plurality of first sampling points and the fourth threshold.

Optionally, if the quantity of the second sampling points is greater than the third threshold, or the ratio of the quantity of the second sampling points to the quantity of the plurality of first sampling points is greater than the fourth threshold, the first detection result indicates that the first frequency band is busy. If the quantity of the second sampling points is not greater than the third threshold, or the ratio of the quantity of the second sampling points to the quantity of the plurality of first sampling points is not greater than the fourth threshold, the first detection result indicates that the first frequency band is idle.

In addition, in a specific implementation, a manner of processing a critical value may change. For example, in some embodiments, if the quantity of the second sampling points is not less than the third threshold, or the ratio of the quantity of the second sampling points to the quantity of the plurality of first sampling points is not less than the fourth threshold, the first detection result indicates that the first frequency band is busy. If the quantity of the second sampling points is less than the third threshold, or the ratio of the quantity of the second sampling points to the quantity of the plurality of first sampling points is less than the fourth threshold, the first detection result indicates that the first frequency band is idle.

Optionally, the third threshold, the fourth threshold, the fifth threshold, or the sixth threshold may be a value preconfigured in the detection apparatus. Optionally, the third threshold, the fourth threshold, the fifth threshold, or the sixth threshold may alternatively be a value predefined in a standard. For example, the third threshold may be a value such as 10, 15, or 20, and the value of the third threshold may further be related to the quantity of the first sampling points. The fourth threshold may be a value such as 0.05, 0.1, or 0.15. Optionally, a value of the fifth threshold may be the same as that of the first threshold, and a value of the sixth threshold may be the same as that of the second threshold.

It should be noted that, the first detection result may further include one or more of the amplitude of the intermediate frequency signal, the power of the intermediate frequency signal, the quantity of third sampling points, or a ratio of the quantity of the third sampling points to the quantity of the plurality of second sampling points.

S104: The detection apparatus determines, based on the first detection result, to perform second processing on the intermediate frequency signal.

In some embodiments, if the first detection result indicates that the first frequency band is busy, the detection apparatus determines to perform the second processing on the intermediate frequency signal.

It should be noted that, that the first detection result indicates that the first frequency band is busy indicates that an interfering signal existing in an environment is relatively strong on the first frequency band. Therefore, the detection apparatus performs the second processing on the intermediate frequency signal, to test whether the interfering signal generates non-negligible impact on target detection of the detection apparatus.

In some other embodiments, if the first detection result indicates that the first frequency band is idle, it indicates that the interfering signal existing in the environment is relatively weak on the first frequency band, and impact of the interfering signal can be ignored. In this case, the detection apparatus performs steps S107 and S108. Steps S107 and S108 are described in the following content, and details are not described herein.

It can be learned based on the foregoing content that, that the first detection result indicates that the first frequency band is busy may include: The amplitude of the intermediate frequency signal is greater than the first threshold, or the power of the intermediate frequency signal is greater than the second threshold, or the quantity of the second sampling points is greater than the third threshold, or the ratio of the quantity of the second sampling points to the quantity of the plurality of first sampling points is greater than the fourth threshold. That the first detection result indicates that the first frequency band is idle may include: The amplitude of the intermediate frequency signal is not greater than the first threshold, or the power of the intermediate frequency signal is not greater than the second threshold, or the quantity of the second sampling points is not greater than the third threshold, or the ratio of the quantity of the second sampling points to the quantity of the plurality of first sampling points is not greater than the fourth threshold.

S105: The detection apparatus performs the second processing on the intermediate frequency signal, to determine a second detection result.

In some embodiments, a method for performing the second processing on the intermediate frequency signal, to determine the second detection result may be: performing two-dimensional Fourier transform on the intermediate frequency signal, to obtain a first data result; determining an amplitude or a power of the first data result; and comparing the amplitude of the first data result with a seventh threshold, or comparing the power of the first data result with an eighth threshold, to determine the second detection result.

Optionally, a manner of performing two-dimensional Fourier transform on the intermediate frequency signal may be: sampling the intermediate frequency signal, to obtain a plurality of sampling points; and then performing two-dimensional Fourier transform (or referred to as two-dimensional discrete Fourier transform) on the plurality of sampling points. Optionally, the plurality of sampling points may be the plurality of sampling points obtained in step S103. In a possible implementation, the detection apparatus may directly perform two-dimensional Fourier transform on the sampling points. In another possible implementation, before performing two-dimensional Fourier transform on the plurality of sampling points of the intermediate frequency signal, the detection apparatus may perform interference cancellation processing on the plurality of sampling points (or referred to as sampling signals) by using an interference cancellation method of the detection apparatus.

The following uses an example to describe a process of obtaining the first data result. The detection apparatus receives signals of N periods, and the signal received in each period is mixed with the local oscillator signal, to obtain intermediate frequency signals of the N periods. The intermediate frequency signals of the N periods are sampled. Assuming that there are M sampling points in each period, there are a total of M×N sampling points in the N periods. The M×N sampling points are arranged into N columns in a manner of placing M sampling points of one period in each column, to form a matrix of M rows and N columns. Optionally, before performing two-dimensional Fourier transform, the detection apparatus may perform interference cancellation processing on the M×N sampling points.

Figure 17A:
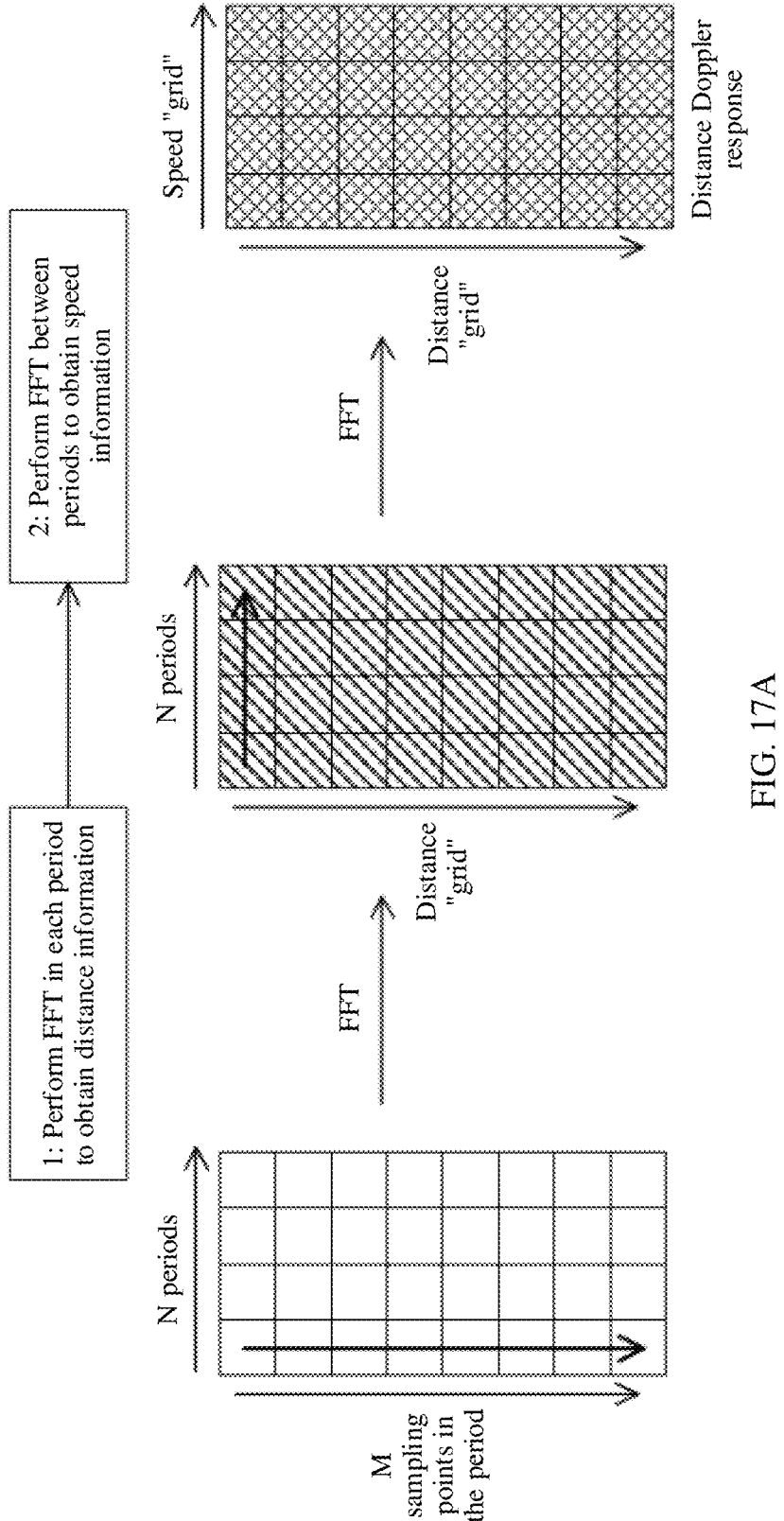
FIG. 17A is a schematic diagram of two-dimensional Fourier transform according to an embodiment of this application.
Figure 17B:
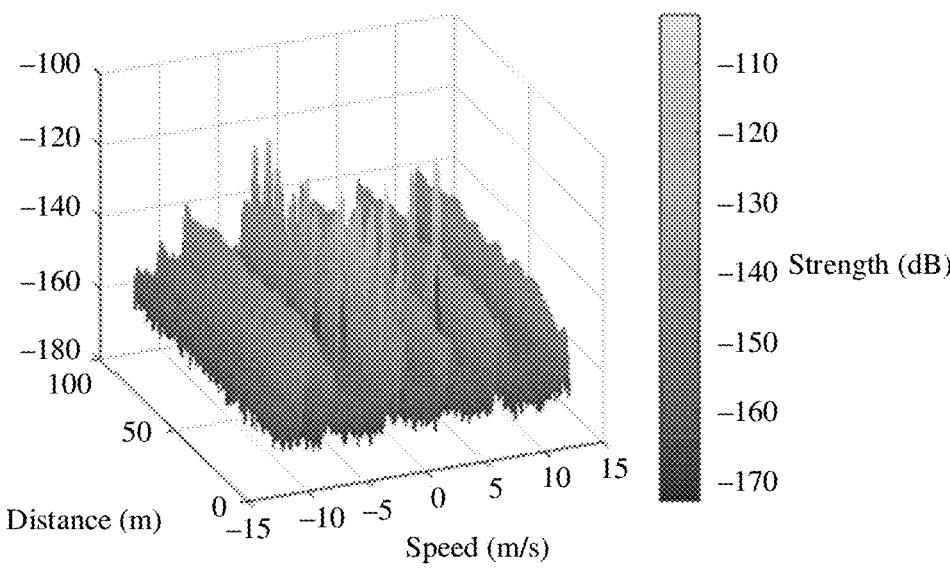
FIG. 17B is a schematic diagram of a power spectrum of a first data result according to an embodiment of this application.

Next, the detection apparatus performs two-dimensional Fourier transform on the M×N sampling points (or M×N sampling points obtained after interference cancellation processing is performed). First, fast Fourier transform (FFT) is performed on the M sampling signals of each period, to obtain a distance response of the intermediate frequency signal in each period. Then, FFT is performed row by row on the N sampling signals with a same distance of each period, to finally obtain a distance Doppler response (a complex matrix with M×N dimensions), namely, the first data result. For example, FIG. 17A is a schematic diagram of two-dimensional Fourier transform according to an embodiment of this application. Each "grid" represents data of one sampling point. The finally obtained distance Doppler response is a complex matrix with M×N dimensions. This matrix may alternatively be expressed in a manner of a power spectrum. For example, FIG. 17B is a schematic diagram of a power spectrum of a first data result according to an embodiment of this application.

Subsequently, in some embodiments, the detection apparatus may compare the amplitude of the obtained first data result (the distance Doppler response) with the seventh threshold, or compare the power of the first data result with the eighth threshold, to determine the second detection result. The second detection result may indicate a size relationship between the amplitude of the first data result and the seventh threshold, or indicate a size relationship between the power of the first data result and the eighth threshold.

Optionally, if the amplitude of the first data result is greater than the seventh threshold, or the power of the first data result is greater than the eighth threshold, the second detection result indicates that the first frequency band is busy. If the amplitude of the first data result is not greater than the seventh threshold, or the power of the first data result is not greater than the eighth threshold, the second detection result indicates that the first frequency band is idle.

In addition, in a specific implementation, a manner of processing a critical value may change. For example, in some embodiments, if the amplitude of the first data result is not less than the seventh threshold, or the power of the first data result is not less than the eighth threshold, the second detection result indicates that the first frequency band is busy. If the amplitude of the first data result is less than the seventh threshold, or the power of the first data result is less than the eighth threshold, the second detection result indicates that the first frequency band is idle.

Optionally, the amplitude of the first data result may be an average value, a maximum value, a median value, or the like of amplitude values of the first data result. The power of the first data result may be an average value, a maximum value, a median value, or the like of power values of the first data result.

Optionally, the seventh threshold or the eighth threshold may be a value preconfigured in the detection apparatus. Optionally, the seventh threshold or the eighth threshold may alternatively be a value predefined in a standard. For example, the eighth threshold may be a sum of receiver sensitivity (for example, −120 dBm), an SINR (for example, 10 dB), and a margin (for example, 5 dB) of the detection apparatus, namely, −105 dBm. It should be noted that, the value of the eighth threshold is merely an example herein. In actual application, the eighth threshold may alternatively be another value. Similarly, there may also be a plurality of manners of determining the value of the seventh threshold.

In some other embodiments, a method for performing the second processing on the intermediate frequency signal, to determine the second detection result may alternatively be: performing two-dimensional Fourier transform on the intermediate frequency signal, to obtain a second data result; and comparing a quantity of third data results with a ninth threshold, or comparing a ratio of a quantity of third data results to a quantity of the second data results with a tenth threshold, to determine the second detection result. The third data result is a data result whose amplitude is greater than an eleventh threshold in the second data results, or a data result whose power is greater than a twelfth threshold in the second data results. The second detection result may indicate a size relationship between the quantity of the third data results and the ninth threshold, or indicate a size relationship between the ratio of the quantity of the third data results to the quantity of the second data results and the tenth threshold.

Optionally, if the quantity of the third data results is greater than the ninth threshold, or the ratio of the quantity of the third data results to the quantity of the second data results is greater than the tenth threshold, the second detection result indicates that the first frequency band is busy. If the quantity of the third data results is not greater than the ninth threshold, or the ratio of the quantity of the third data results to the quantity of the second data results is not greater than the tenth threshold, the second detection result indicates that the first frequency band is idle.

In addition, in a specific implementation, a manner of processing a critical value may change. For example, in some embodiments, if the quantity of the third data results is not less than the ninth threshold, or the ratio of the quantity of the third data results to the quantity of the second data results is not less than the tenth threshold, the second detection result indicates that the first frequency band is busy. If the quantity of the third data results is less than the ninth threshold, or the ratio of the quantity of the third data results to the quantity of the second data results is less than the tenth threshold, the second detection result indicates that the first frequency band is idle.

For a process of obtaining the second data result, refer to the foregoing process of obtaining the first data result. Details are not described herein again. Optionally, the ninth threshold, the tenth threshold, the eleventh threshold, or the twelfth threshold may be a value preconfigured in the detection apparatus. Optionally, the ninth threshold, the tenth threshold, the eleventh threshold, or the twelfth threshold may alternatively be a value predefined in a standard. For example, the ninth threshold may be a value such as 10, 15, or 20, and the value of the ninth threshold may alternatively be related to the quantity of the third data results. The tenth threshold may be a value such as 0.05, 0.1, or 0.15. Optionally, a value of the eleventh threshold may be the same as that of the seventh threshold, and a value of the twelfth threshold may be the same as that of the eighth threshold.

It should be noted that, the second detection result may further include one or more of the amplitude of the first data result, the power of the first data result, the quantity of the third data results, or the ratio of the quantity of the third data results to the quantity of the second data results.

S106: The detection apparatus determines a state of the first frequency band based on the second detection result.

Specifically, a manner of determining, by the detection apparatus, the state of the first frequency band based on the second detection result may be: if the second detection result indicates that the first frequency band is busy, determining that the state of the first frequency band is a first state; or if the second detection result indicates that the first frequency band is idle, determining that the state of the first frequency band is a second state. Optionally, the first state may be a busy state, and the second state may be an idle state.

It can be learned based on the foregoing content that, that the second detection result indicates that the first frequency band is busy may include: The amplitude of the first data result is greater than the seventh threshold, or the power of the first data result is greater than the eighth threshold, or the quantity of the third data results is greater than the ninth threshold, or the ratio of the quantity of the third data results to the quantity of the second data results is greater than the tenth threshold. That the second detection result indicates that the first frequency band is idle may include: The amplitude of the first data result is not greater than the seventh threshold, or the power of the first data result is not greater than the eighth threshold, or the quantity of the third data results is not greater than the ninth threshold, or the ratio of the quantity of the third data results to the quantity of the second data results is not greater than the tenth threshold.

It should be noted that, if the second detection result indicates that the first frequency band is busy, it indicates that the detection apparatus cannot eliminate impact of the interfering signal, and the interfering signal generates non-negligible impact on target detection of the detection apparatus. If the second detection result indicates that the first frequency band is idle, it indicates that the detection apparatus can eliminate impact of the interfering signal, and the impact generated by the interfering signal on the target detection of the detection apparatus can be ignored.

It can be understood that, if the state of the first frequency band is the first state, it indicates that on the first frequency band, an interfering signal exists in the environment in which the detection apparatus is located, and the detection apparatus cannot eliminate impact of the interfering signal. If the state of the first frequency band is the second state, it indicates that on the first frequency band, an interfering signal exists in the environment in which the detection apparatus is located, and the detection apparatus can eliminate impact of the interfering signal. In other words, the detection apparatus may use a frequency band on which the state is the second state as transmit frequency band of a radar signal, to reduce or avoid interference between the detection apparatus and another radar detection apparatus.

In some other embodiments, the detection apparatus may alternatively determine, based on the first detection result, to skip performing the second processing on the intermediate frequency signal. After performing step S103, the detection apparatus performs the following steps S107 and S108:

S107: The detection apparatus determines, based on the first detection result, to skip performing second processing on the intermediate frequency signal.

In some embodiments, if the first detection result indicates that the first frequency band is idle, the detection apparatus determines to skip performing the second processing on the intermediate frequency signal. If the first detection result indicates that the first frequency band is idle, it indicates that the interfering signal existing in the environment is relatively weak on the first frequency band, and impact of the interfering signal can be ignored. Because the interfering signal can be ignored, whether the interfering signal generates non-negligible impact on target detection of the detection apparatus may not need to be tested. In this manner, a time for determining the state of the first frequency band by the detection apparatus can be reduced, to improve detection efficiency of the detection apparatus.

S108: The detection apparatus determines a state of the first frequency band based on the first detection result.

Specifically, if the first detection result indicates that the first frequency band is idle, the detection apparatus determines that the state of the first frequency band is a third state. It can be understood that, if the state of the first frequency band is the third state, it indicates that the interfering signal existing in the environment in which the detection apparatus is located is relatively weak on the first frequency band, and impact of the interfering signal can be ignored. In other words, the detection apparatus may use a frequency band on which the state is the third state as transmit frequency band of a radar signal, to reduce or avoid interference between the detection apparatus and another radar detection apparatus.

Figure 18:
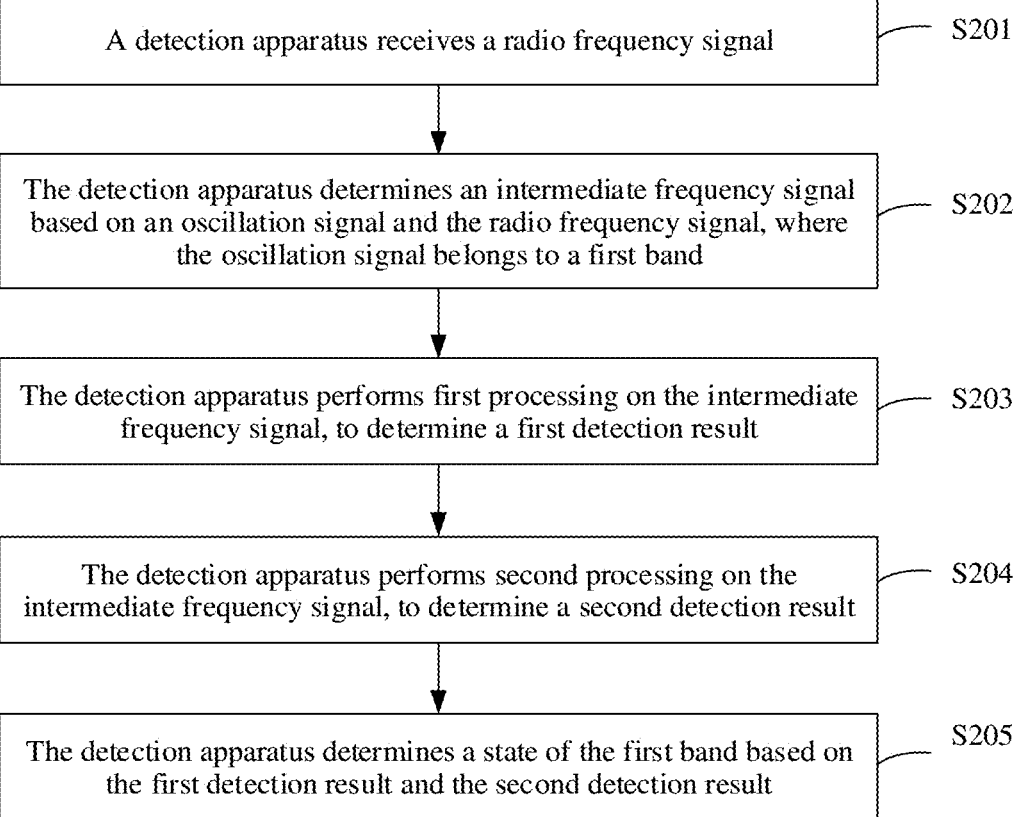
FIG. 18 is a flowchart of another frequency band state determining method according to an embodiment of this application.

The foregoing describes the frequency band state determining method according to this embodiment of this application. The following describes another frequency band state determining method according to an embodiment of this application. The method is applied to a detection apparatus. FIG. 18 is a flowchart of the another frequency band state determining method according to an embodiment of this application. The method includes the following steps:

S201: The detection apparatus receives a radio frequency signal.

S202: The detection apparatus determines an intermediate frequency signal based on an oscillation signal and the radio frequency signal, where the oscillation signal belongs to a first frequency band.

S203: The detection apparatus performs first processing on the intermediate frequency signal, to determine a first detection result.

It should be noted that, for implementations of steps S201 to S203, refer to the implementations described in steps S101 to S103 in the embodiment corresponding to FIG. 15. Details are not described herein again. The first detection result may indicate that the first frequency band is busy, or indicate that the first frequency band is idle.

S204: The detection apparatus performs second processing on the intermediate frequency signal, to determine a second detection result.

It should be noted that, for an implementation of step S204, refer to the implementation described in step S105 in the embodiment corresponding to FIG. 15. Details are not described herein again. The second detection result may indicate that the first frequency band is busy, or indicate that the first frequency band is idle.

S205: The detection apparatus determines a state of the first frequency band based on the first detection result and the second detection result.

Specifically, there may be a plurality of manners in which the detection apparatus determines the state of the first frequency band based on the first detection result and the second detection result. The following describes several possible determining manners.

In a first manner, if both the first detection result and second detection result indicate that the first frequency band is busy, the state of the first frequency band is a first state. If both the first detection result and the second detection result do not indicate that the first frequency band is busy, the state of the first frequency band is a second state. It should be noted that, if both the first detection result and the second detection result indicate that the first frequency band is busy, it indicates that on the first frequency band, an interfering signal exists in an environment in which the detection apparatus is located, and the detection apparatus cannot eliminate impact of the interfering signal. In this case, the state of the first frequency band is the first state. In all other cases, the state of the first frequency band is a second state. The first state may be a busy state, and the second state may be an idle state.

For example, in the first manner, the detection apparatus may use a frequency band on which the state is the second state as a transmit frequency band of a radar signal, to reduce or avoid interference between the detection apparatus and another radar detection apparatus. In this state determining method, a requirement on an optional state (namely, the second state) of the frequency band is relatively low, and an interference cancellation capability of the detection apparatus is considered. In this way, a selection range of the transmit frequency band of the radar signal of the detection apparatus can be expanded. In a use scenario in which a plurality of detection apparatuses are collaboratively allocated with transmit frequency bands, collaborative allocation of the frequency bands can be performed more appropriately, to increase resource utilization of the transmit frequency bands of radars.

In a second manner, if both the first detection result and the second detection result indicate that the first frequency band is idle, the state of the first frequency band is a second state. If both the first detection result and the second detection result do not indicate that the first frequency band is idle, the state of the first frequency band is a first state. It should be noted that, if both the first detection result and second detection result indicate that the first frequency band is idle, it indicates that an interfering signal existing in an environment in which the detection apparatus is located is relatively weak on the first frequency band and can be ignored, and the detection apparatus can eliminate impact of the interfering signal. In this case, the state of the first frequency band is the second state. In all other cases, the state of the first frequency band is the first state. The first state may be a busy state, and the second state may be an idle state.

For example, in the second manner, the detection apparatus may use a frequency band on which the state is the second state as a transmit frequency band of a radar signal, to reduce or avoid interference between the detection apparatus and another radar detection apparatus. In this state determining method, a requirement on an optional state (namely, the second state) of the frequency band is relatively high, and the method is applicable to a detection apparatus with a relatively high requirement on detection precision.

In a third manner, if the first detection result indicates that the first frequency band is idle, the state of the first frequency band is a third state. If the first detection result indicates that the first frequency band is busy and the second detection result indicates that the first frequency band is busy, the state of the first frequency band is a fourth state. If the first detection result indicates that the first frequency band is busy and the second detection result indicates that the first frequency band is idle, the state of the first frequency band is a fifth state. It should be noted that, if the first detection result indicates that the first frequency band is idle, it indicates that an interfering signal existing in an environment in which the detection apparatus is located is relatively weak on the first frequency band and can be ignored. If the first detection result indicates that the first frequency band is busy and the second detection result indicates that the first frequency band is busy, it indicates that on the first frequency band, an interfering signal exists in an environment in which the detection apparatus is located, and the detection apparatus cannot eliminate impact of the interfering signal. If the first detection result indicates that the first frequency band is busy and the second detection result indicates that the first frequency band is idle, it indicates that on the first frequency band, an interfering signal exists in an environment in which the detection apparatus is located, and the detection apparatus can eliminate impact of the interfering signal.

For example, in the third manner, the detection apparatus may use a frequency band on which the state is the third state or the fifth state as a transmit frequency band of a radar signal, to reduce or avoid interference between the detection apparatus and another radar detection apparatus. Optionally, the detection apparatus may preset priorities of the third state and the fifth state. In some embodiments, the detection apparatus may select the transmit frequency band of a radar signal from a plurality of frequency bands based on states of the plurality of frequency bands and priorities of the states. In subsequent content, this selection manner is described in detail. Details are not described herein.

In a fourth manner, if the second detection result indicates that the first frequency band is idle, the state of the first frequency band is a sixth state. If the second detection result indicates that the first frequency band is busy, and the first detection result indicates that the first frequency band is busy, the state of the first frequency band is a seventh state. If the second detection result indicates that the first frequency band is busy, and the first detection result indicates that the first frequency band is idle, the state of the first frequency band is an eighth state. It should be noted that, if the second detection result indicates that the first frequency band is idle, it indicates that on the first frequency band, the detection apparatus can eliminate impact of an interfering signal. If the second detection result indicates that the first frequency band is busy, and the first detection result indicates that the first frequency band is busy, it indicates that on the first frequency band, the detection apparatus cannot eliminate impact of the interfering signal, and the interfering signal existing in an environment in which the detection apparatus is located is relatively strong. If the second detection result indicates that the first frequency band is busy and the first detection result indicates that the first frequency band is idle, it indicates that on the first frequency band, the detection apparatus cannot eliminate impact of the interfering signal, and the interfering signal existing in an environment in which the detection apparatus is located is relatively weak. In this state determining manner, a threshold for determining the second detection result may be less than a threshold for determining the first detection result. This can be understood as that, a requirement on an interference cancellation capability of the detection apparatus is higher.

For example, in the fourth manner, the detection apparatus may use a frequency band on which the state is the sixth state or the eighth state as a transmit frequency band of a radar signal, to reduce or avoid interference between the detection apparatus and another radar detection apparatus. Optionally, the detection apparatus may preset priorities of the sixth state or the eighth state. In some embodiments, the detection apparatus may select the transmit frequency band of a radar signal from a plurality of frequency bands based on states of the plurality of frequency bands and priorities of the states.

In a fifth manner, if both the first detection result and second detection result indicate that the first frequency band is busy, the state of the first frequency band is a ninth state. If the first detection result indicates that the first frequency band is busy and the second detection result indicates that the first frequency band is idle, the state of the first frequency band is a tenth state. If the first detection result indicates that the first frequency band is idle and the second detection result indicates that the first frequency band is busy, the state of the first frequency band is an eleventh state. If both the first detection result and the second detection result indicate that the first frequency band is idle, the state of the first frequency band is a twelfth state. For meanings represented by the states, refer to descriptions in the foregoing content. Details are not described herein again.

Optionally, the detection apparatus may preset priorities of the ninth state, the tenth state, the eleventh state, and the twelfth state. In some embodiments, the detection apparatus may select the transmit frequency band of a radar signal from a plurality of frequency bands based on states of the plurality of frequency bands and priorities of the states.

The foregoing describes two frequency band state determining methods provided in the embodiments of this application. After determining the state of the frequency band, the detection apparatus may determine the transmit frequency band of a radar signal based on the determined state of the frequency band.

In a first possible implementation, the detection apparatus may detect a state of one or more frequency bands in a plurality of frequency bands, and when determining that a state of a second frequency band is an optional state, the detection apparatus determines that the second frequency band is the transmit frequency band of a radar signal. The second frequency band is one of the plurality of frequency bands.

For example, in the embodiment corresponding to FIG. 15, optional states of the frequency band are the second state and the third state.

In the embodiment corresponding to FIG. 18, for the first determining manner and the second determining manner described in the foregoing content, the optional state of the frequency band may be the second state. For the third determining manner described in the foregoing content, the optional states of the frequency band may be the third state and the fifth state. For the fourth determining manner described in the foregoing content, the optional states of the frequency band may be the sixth state or the eighth state. For the fifth determining manner described in the foregoing content, the optional states of the frequency band may be the tenth state, the eleventh state, and the twelfth state.

Optionally, the detection apparatus may first determine a state of a previously-used transmit frequency band of a radar signal. If the state of this frequency band is an optional state, the detection apparatus determines that this frequency band is a to-be-used transmit frequency band of a radar signal. If the state of this frequency band is not an optional state, the detection apparatus then determines a frequency band in the plurality of frequency bands other than this frequency band, until a frequency band with an optional state is determined. In this manner, switching between transmit frequency bands can be avoided to the greatest extent, to improve efficiency of transmitting a radar signal.

In a second possible implementation, the detection apparatus may determine a state of each frequency band in a plurality of frequency bands; and select a transmit frequency band of a radar from the plurality of frequency bands based on the state of each of the plurality of frequency bands.

Specifically, there may be a plurality of manners in which the detection apparatus selects the transmit frequency band of the radar from the plurality of frequency bands based on the state of each frequency band. The following describes several possible manners.

In a first manner, the detection apparatus may select the transmit frequency band of the radar from the plurality of frequency bands based on the state and a frequency value of each of the plurality of frequency bands.

Optionally, the detection apparatus may select candidate frequency bands from the plurality of frequency bands based on the state of each of the plurality of frequency bands, and states of the candidate frequency bands are optional states. Subsequently, the detection apparatus selects the transmit frequency band of the radar from the candidate frequency bands based on the frequency value of each of the plurality of frequency bands. Optionally, a frequency value of the transmit frequency band of the radar is smallest in the candidate frequency bands. Because the radar signal has a path loss, and a higher frequency indicates a higher path loss, a transmit frequency band with a smallest path loss can be selected in this manner.

In a second manner, the detection apparatus may select the transmit frequency band of the radar from the plurality of frequency bands based on state information of each of the plurality of frequency bands and the previously-used transmit frequency band of the radar.

Optionally, the detection apparatus selects candidate frequency bands from the plurality of frequency bands based on the state of each of the plurality of frequency bands, and states of the candidate frequency bands are optional states. Subsequently, the detection apparatus selects the transmit frequency band of the radar from the candidate frequency bands based on the previously-used transmit frequency band of the radar. Optionally, an absolute value of a difference between a frequency value of the selected transmit frequency band of the radar and a frequency value of the previously-used transmit frequency band of a radar signal is less than an absolute value of a difference between a frequency value of another candidate frequency band and the frequency value of the previously-used transmit frequency band of a radar signal. The detection apparatus needs to perform adjustment on hardware to switch the radar transmit frequency band. Therefore, in this manner, the difference between the selected transmit frequency band of a radar signal and the previously-used transmit frequency band of the radar can be made smallest to improve transmit efficiency of a radar signal.

In a third manner, the detection apparatus may select the transmit frequency band of a radar signal from the plurality of frequency bands based on states of the plurality of frequency bands and priorities of the states.

Optionally, the transmit frequency band of a radar signal that is determined by the detection apparatus may be a frequency band whose state has a highest priority in the states of the plurality of frequency bands. Specifically, the detection apparatus may pre-store the priorities of the states.

For example, in the embodiment corresponding to FIG. 15, the priorities of the states of the frequency band in descending order may be the second state, the third state, and the first state; or the third state, the second state, and the first state.

In the embodiment corresponding to FIG. 18, for the first determining manner and the second determining manner described in the foregoing content, the priorities of the states of the frequency band in descending order may be the second state and the first state. For the third determining manner described in the foregoing content, the priorities of the states of the frequency band in descending order may be the third state, the fifth state, and the fourth state. For the fourth determining manner described in the foregoing content, the priorities of the states of the frequency band in descending order may be the sixth state, the eighth state, and the seventh state. For the fifth determining manner described in the foregoing content, the optional states of the frequency band may be the twelfth state, the eleventh state, the tenth state, and the ninth state, or the twelfth state, the tenth state, the eleventh state, and the ninth state.

If a plurality of frequency bands have the highest priority, in an optional implementation, the detection apparatus may select any one of these frequency bands as the transmit frequency band of a radar signal. In another optional implementation, the detection apparatus may select a frequency band with a lowest frequency from these frequency bands as the transmit frequency band of the radar signal. In another optional implementation, the detection apparatus may select, from these frequency bands, a frequency band with a smallest difference from the previously-used transmit frequency band of the radar as the transmit frequency band of a radar signal.

In another optional implementation, the detection apparatus may calculate a score of each of the frequency bands with the highest priority. The detection apparatus may determine that the transmit frequency band of the radar is a frequency band with a lowest score in the plurality of frequency bands with the highest priority. Specifically, the detection apparatus pre-stores a first calculation weight of the first detection result and a second calculation weight of the second detection result. A score of one frequency band is determined by the first detection result, the second detection result, the first calculation weight, and the second calculation weight. The first detection result includes one or more of an amplitude of the intermediate frequency signal, a power of the intermediate frequency signal, a quantity of third sampling points, or a ratio of the quantity of the third sampling points to a quantity of a plurality of second sampling points. The second detection result includes one or more of an amplitude of a first data result, a power of the first data result, a quantity of third data results, or a ratio of a quantity of third data results to a quantity of second data results.

For example, a score of one frequency band may be a sum of a product that corresponds to the frequency band and that is of an amplitude of an intermediate frequency signal and a first calculation weight, and a product that corresponds to the frequency band and that is of an amplitude of a first data result corresponding to the frequency band and a second calculation weight. Optionally, a score of one frequency band may alternatively be a sum of a product that corresponds to the frequency band and that is of a power of an intermediate frequency signal and a first calculation weight, and a product that corresponds to the frequency band and that is of a power of a first data result and a second calculation weight. Optionally, a score of one frequency band may alternatively be a sum of a product that corresponds to the frequency band and that is of a quantity of third sampling points and a first calculation weight, and a product that corresponds to the frequency band and that is of a quantity of third data results and a second calculation weight. Optionally, a score of one frequency band may alternatively be a sum of a product that corresponds to the frequency band and that is of a ratio of a quantity of third sampling points to a quantity of a plurality of second sampling points and a first calculation weight, and a product that corresponds to the frequency band and that is of a ratio of a quantity of third data results to a quantity of second data results and a second calculation weight.

For example, in the embodiment corresponding to FIG. 15, if the detection apparatus does not perform the second processing, a calculation weight of the first detection result may be 1. If the first detection apparatus performs the second processing, a sum of the calculation weights of the first detection result and the second detection result may be 1. For example, the calculation weight of the first detection result is 0.6, and the calculation weight of the second detection result is 0.4. The calculation weights may alternatively be other scores. This is not limited in this embodiment of this application.

In the embodiment corresponding to FIG. 18, a sum of the calculation weights of the first detection result and the second detection result may be 1. For example, the calculation weight of the first detection result is 0.6, and the calculation weight of the second detection result is 0.4. The calculation weights may alternatively be other scores. This is not limited in this embodiment of this application.

The foregoing describes the method embodiments of this application, and the following describes corresponding apparatus embodiments.

Figure 19:
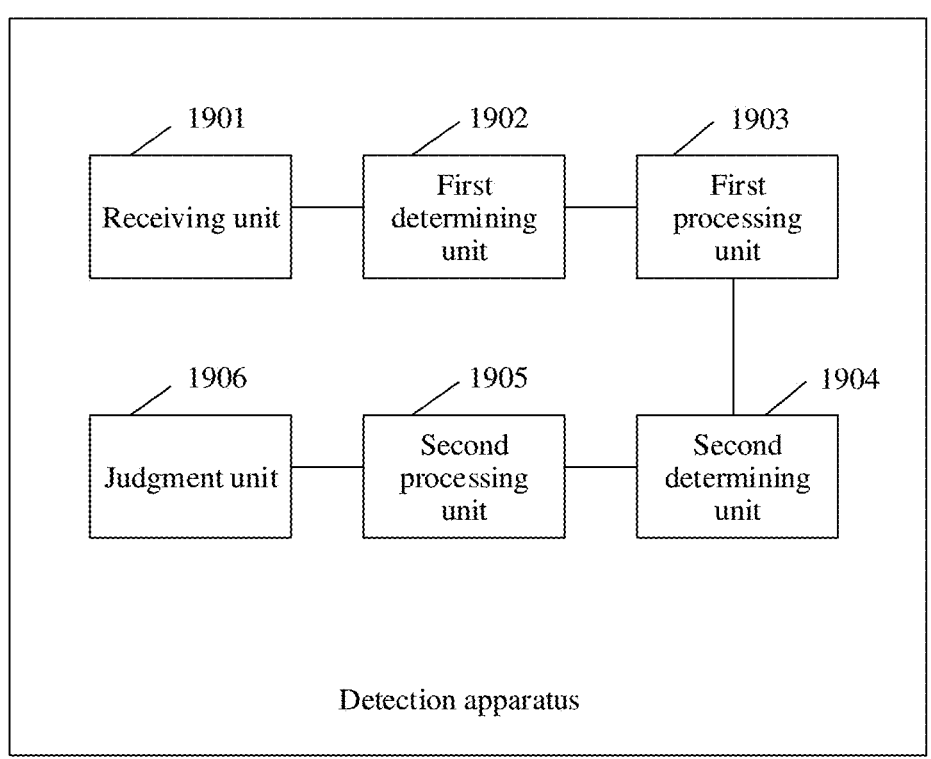
FIG. 19 is a schematic diagram of a detection apparatus according to an embodiment of this application.

FIG. 19 is a schematic diagram of a detection device according to an embodiment of this application. The detection device includes a receiving unit 1901, a first determining unit 1902, a first processing unit 1903, a second determining unit 1904, a second processing unit 1905, and a judgment unit 1906. The following further describes these units.

The receiving unit 1901 may be configured to receive a radio frequency signal. For an operation performed by the receiving unit 1901, refer to the related description in step S101 in FIG. 15.

The first determining unit 1902 may be configured to determine an intermediate frequency signal based on an oscillation signal and the radio frequency signal, where the oscillation signal belongs to a first frequency band. For an operation performed by the first determining unit 1902, refer to the related description in step S102 in FIG. 15.

The first processing unit 1903 may be configured to perform first processing on the intermediate frequency signal, to determine a first detection result. For an operation performed by the first processing unit 1903, refer to the related description in step S103 in FIG. 15.

The second determining unit 1904 may be configured to determine, based on the first detection result, to perform second processing on the intermediate frequency signal. For an operation performed by the second determining unit 1904, refer to the related description in step S104 in FIG. 15.

The second processing unit 1905 may be configured to perform the second processing on the intermediate frequency signal, to determine a second detection result. For an operation performed by the second processing unit 1905, refer to the related description in step S105 in FIG. 15.

The judgment unit 1906 may be configured to determine a state of the first frequency band based on the second detection result. For an operation performed by the judgment unit 1906, refer to the related description in step S106 in FIG. 15.

In an optional implementation, the first processing unit is specifically configured to: perform intermediate frequency detection on the intermediate frequency signal, to determine an amplitude or a power of the intermediate frequency signal; and compare the amplitude of the intermediate frequency signal with a first threshold, or compare the power of the intermediate frequency signal with a second threshold, to determine the first detection result.

In an optional implementation, the second determining unit is specifically configured to: if the amplitude of the intermediate frequency signal is greater than the first threshold, or the power of the intermediate frequency signal is greater than the second threshold, determine to perform the second processing on the intermediate frequency signal.

In an optional implementation, the first processing unit is specifically configured to: sample the intermediate frequency signal, to obtain a plurality of first sampling points; and compare a quantity of second sampling points with a third threshold, or compare a ratio of a quantity of second sampling points to a quantity of the plurality of first sampling points with a fourth threshold, to determine the first detection result, where the second sampling point is a sampling point whose amplitude is greater than a fifth threshold in the plurality of first sampling points, or a sampling point whose power is greater than a sixth threshold in the plurality of first sampling points.

In an optional implementation, the second determining unit is specifically configured to: if the quantity of the second sampling points is greater than the third threshold, or the ratio of the quantity of the second sampling points to the quantity of the plurality of first sampling points is greater than the fourth threshold, determine to perform the second processing on the intermediate frequency signal.

In an optional implementation, the second processing unit is specifically configured to: perform two-dimensional Fourier transform on the intermediate frequency signal, to obtain a first data result; determine an amplitude or a power of the first data result; and compare the amplitude of the first data result with a seventh threshold, or compare the power of the first data result with an eighth threshold, to determine the second detection result.

In an optional implementation, the judgment unit is specifically configured to: if the amplitude of the first data result is greater than the seventh threshold, or the power of the first data result is greater than the eighth threshold, determine that the state of the first frequency band is a first state; or if the amplitude of the first data result is not greater than the seventh threshold, or the power of the first data result is not greater than the eighth threshold, determine that the state of the first frequency band is a second state.

In an optional implementation, the second processing unit is specifically configured to: perform two-dimensional Fourier transform on the intermediate frequency signal, to obtain a second data result; and compare a quantity of third data results with a ninth threshold, or compare a ratio of a quantity of third data results to a quantity of the second data results with a tenth threshold, to determine the second detection result, where the third data result is a data result whose amplitude is greater than an eleventh threshold in the second data results, or a data result whose power is greater than a twelfth threshold in the second data results.

In an optional implementation, the judgment unit is specifically configured to: if the quantity of the third data results is greater than the ninth threshold, or the ratio of the quantity of the third data results to the quantity of the second data results is greater than the tenth threshold, determine that the state of the first frequency band is a first state; or if the quantity of the third data results is not greater than the ninth threshold, or the ratio of the quantity of the third data results to the quantity of the second data results is not greater than the tenth threshold, determine that the state of the first frequency band is a second state.

In an optional implementation, the first state is a busy state, and the second state is an idle state.

For implementations of operations of FIG. 19, refer to the corresponding description of the method embodiment shown in FIG. 15. In an embodiment, the receiving unit 1901 may be a functional module implemented by hardware, and the first determining unit 1902, the first processing unit 1903, the second determining unit 1904, the second processing unit 1905, and the judgment unit 1906 may be functional modules implemented by software. Functions of these functional modules are implemented by a program or code stored in a memory. The detection device executes the program or the code by using at least one processor, to implement the functions of the functional modules.

By using the detection apparatus shown in FIG. 19, a frequency band state can be determined by using a same threshold, so that in a use scenario of a cooperative radar, fairness in selecting resources can be balanced; in addition, the frequency band state can be determined with reference to an anti-interference capability of a detection apparatus, to increase resource utilization.

Figure 20:
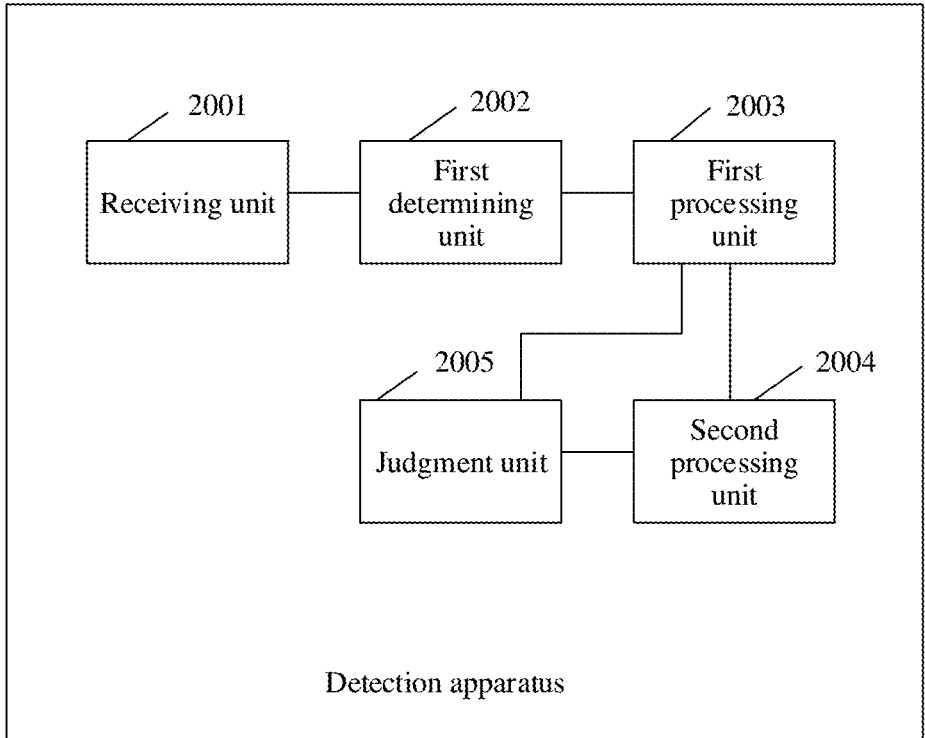
FIG. 20 is a schematic diagram of another detection apparatus according to an embodiment of this application.

FIG. 20 is a schematic diagram of another detection device according to an embodiment of this application. The detection device includes a receiving unit 2001, a determining unit 2002, a first processing unit 2003, a second processing unit 2004, and a judgment unit 2005. The following further describes these units.

The receiving unit 2001 may be configured to receive a radio frequency signal. For an operation performed by the receiving unit 2001, refer to the related description in step S201 in FIG. 18.

The determining unit 2002 may be configured to determine an intermediate frequency signal based on an oscillation signal and the radio frequency signal, where the oscillation signal belongs to a first frequency band. For an operation performed by the determining unit 2002, refer to the related description in step S202 in FIG. 18.

The first processing unit 2003 may be configured to perform first processing on the intermediate frequency signal, to determine a first detection result. For an operation performed by the first processing unit 2003, refer to the related description in step S203 in FIG. 18.

The second processing unit 2004 may be configured to perform second processing on the intermediate frequency signal, to determine a second detection result. For an operation performed by the second processing unit 2004, refer to the related description in step S204 in FIG. 18.

The judgment unit 2005 may be configured to determine a state of the first frequency band based on the first detection result and the second detection result. For an operation performed by the judgment unit 2005, refer to the related description in step S205 in FIG. 18.

In an optional implementation, the first processing unit is specifically configured to: perform intermediate frequency detection on the intermediate frequency signal, to determine an amplitude or a power of the intermediate frequency signal; and compare the amplitude of the intermediate frequency signal with a first threshold, or compare the power of the intermediate frequency signal with a second threshold, to determine the first detection result.

In an optional implementation, the first processing unit is specifically configured to: sample the intermediate frequency signal, to obtain a plurality of first sampling points; and compare a quantity of second sampling points with a third threshold, or compare a ratio of a quantity of second sampling points to a quantity of the plurality of first sampling points with a fourth threshold, to determine the first detection result, where the second sampling point is a sampling point whose amplitude is greater than a fifth threshold in the plurality of first sampling points, or a sampling point whose power is greater than a sixth threshold in the plurality of first sampling points.

In an optional implementation, the second processing unit is specifically configured to: perform two-dimensional Fourier transform on the intermediate frequency signal, to obtain a first data result; determine an amplitude or a power of the first data result; and compare the amplitude of the first data result with a seventh threshold, or compare the power of the first data result with an eighth threshold, to determine the second detection result.

In an optional implementation, the second processing unit is specifically configured to: perform two-dimensional Fourier transform on the intermediate frequency signal, to obtain a second data result; and compare a quantity of third data results with a ninth threshold, or compare a ratio of a quantity of third data results to a quantity of the second data results with a tenth threshold, to determine the second detection result, where the third data result is a data result whose amplitude is greater than an eleventh threshold in the second data results, or a data result whose power is greater than a twelfth threshold in the second data results.

In an optional implementation, the judgment unit is specifically configured to: if both the first detection result and the second detection result indicate that the first frequency band is busy, determine that the state of the first frequency band is a first state; or if both the first detection result and the second detection result do not indicate that the first frequency band is busy, determine that the state of the first frequency band is a second state.

In an optional implementation, the judgment unit is specifically configured to: if both the first detection result and the second detection result indicate that the first frequency band is idle, determine that the state of the first frequency band is a second state; or if both the first detection result and the second detection result do not indicate that the first frequency band is idle, determine that the state of the first frequency band is a first state.

In an optional implementation, the first state is a busy state, and the second state is an idle state.

In an optional implementation, the judgment unit is specifically configured to: if the first detection result indicates that the first frequency band is idle, determine that the state of the first frequency band is a third state; if the first detection result indicates that the first frequency band is busy, and the second detection result indicates that the first frequency band is busy, determine that the state of the first frequency band is a fourth state; or if the first detection result indicates that the first frequency band is busy, and the second detection result indicates that the first frequency band is idle, determine that the state of the first frequency band is a fifth state.

In an optional implementation, the judgment unit is specifically configured to: if the second detection result indicates that the first frequency band is idle, determine that the state of the first frequency band is a sixth state; if the second detection result indicates that the first frequency band is busy, and the first detection result indicates that the first frequency band is busy, determine that the state of the first frequency band is a seventh state; or if the second detection result indicates that the first frequency band is busy, and the first detection result indicates that the first frequency band is idle, determine that the state of the first frequency band is an eighth state.

In an optional implementation, the judgment unit is specifically configured to: if both the first detection result and the second detection result indicate that the first frequency band is busy, determine that the state of the first frequency band is a ninth state; if the first detection result indicates that the first frequency band is busy, and the second detection result indicates that the first frequency band is idle, determine that the state of the first frequency band is a tenth state; if the first detection result indicates that the first frequency band is idle, and the second detection result indicates that the first frequency band is busy, determine that the state of the first frequency band is an eleventh state; or if both the first detection result and the second detection result indicate that the first frequency band is idle, determine that the state of the first frequency band is a twelfth state.

In an optional implementation, the first state is a busy state, and the second state is an idle state.

For implementations of operations of FIG. 20, refer to the corresponding description of the method embodiment shown in FIG. 18. The foregoing units may be implemented in a manner of hardware, software, or a combination of software and hardware. In an embodiment, the receiving unit 2001 may be a functional module implemented by hardware, and the determining unit 2002, the first processing unit 2003, the second processing unit 2004, and the judgment unit 2005 may be functional modules implemented by software. Functions of these functional modules are implemented by a program or code stored in a memory. The detection device executes the program or the code by using at least one processor, to implement the functions of the functional modules.

By using the detection apparatus shown in FIG. 20, a frequency band state can be determined by using a same threshold, so that in a use scenario of a cooperative radar, fairness in selecting resources can be balanced; in addition, the frequency band state can be determined with reference to an anti-interference capability of a detection apparatus, to increase resource utilization.

Figure 21:
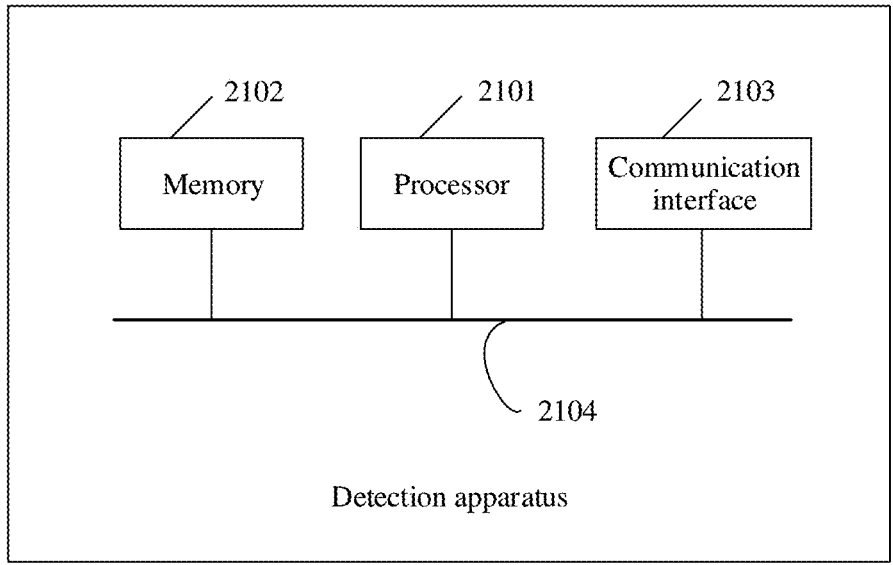
FIG. 21 is a schematic diagram of another detection apparatus according to an embodiment of this application.

FIG. 21 shows another detection device according to an embodiment of this application. The detection device includes a processor 2101, a memory 2102, and a communications interface 2103. The processor 2101, the memory 2102, and the communications interface 2103 are connected to each other by using a bus 2104.

The memory 2102 includes but is not limited to a random access memory (RAM), a read-only memory (ROM), an erasable programmable read-only memory (EPROM), or a compact disc read-only memory (CD-ROM). The memory 2102 is configured to store related instructions and related data.

The communications interface 2103 may be a circuit or a component that can be configured to receive information, for example, a data transmission interface, a communications interface, or a receiver.

The processor 2101 may be one or more central processing units (CPUs). When the processor 2101 is one CPU, the CPU may be a single-core CPU or a multi-core CPU.

The processor 2101 in the detection device reads and executes program code stored in the memory 2102, to perform the following operations: receiving a radio frequency signal; determining an intermediate frequency signal based on an oscillation signal and the radio frequency signal, where the oscillation signal belongs to a first frequency band; performing first processing on the intermediate frequency signal, to determine a first detection result; determining, based on the first detection result, to perform second processing on the intermediate frequency signal; performing the second processing on the intermediate frequency signal, to determine a second detection result; and determining a state of the first frequency band based on the second detection result.

For specific details of each operation performed by the processor 2101 in FIG. 21, correspondingly refer to the corresponding description of the method embodiment shown in FIG. 15. By using the detection apparatus shown in FIG. 21, a frequency band state can be determined by using a same threshold, so that in a use scenario of a cooperative radar, fairness in selecting resources can be balanced; in addition, the frequency band state can be determined with reference to an anti-interference capability of a detection apparatus, to increase resource utilization.

Figure 22:
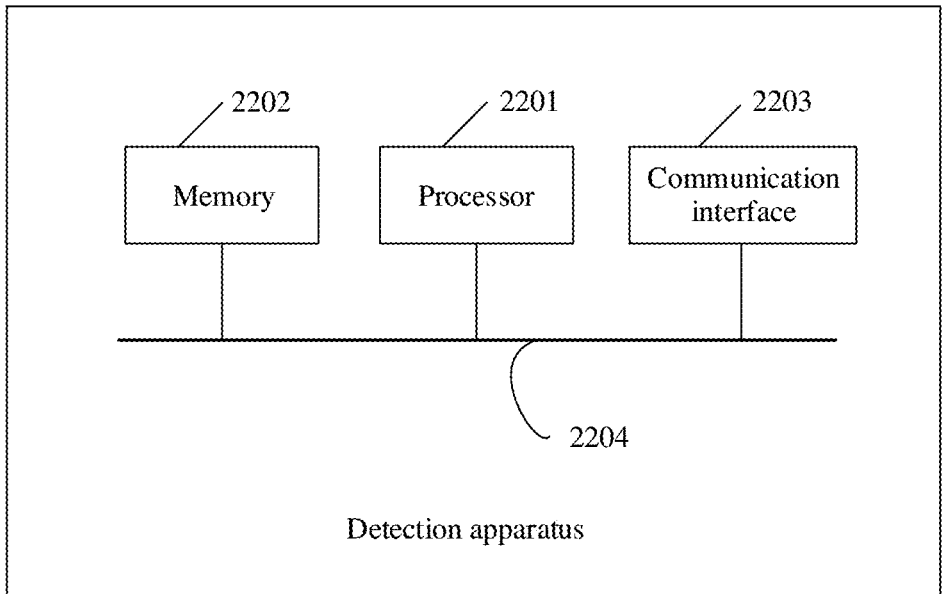
FIG. 22 is a schematic diagram of another detection apparatus according to an embodiment of this application.

FIG. 22 shows another detection apparatus according to an embodiment of this application. The detection apparatus includes a processor 2201, a memory 2202, and a communications interface 2203. The processor 2201, the memory 2202, and the communications interface 2203 are connected to each other by using a bus 2204.

The memory 2202 includes but is not limited to a random access memory (RAM), a read-only memory (ROM), an erasable programmable read-only memory (EPROM), or a compact disc read-only memory (CD-ROM). The memory 2202 is configured to store related instructions and related data.

The communications interface 2203 may be a circuit or a component that can be configured to receive information, for example, a data transmission interface, a communications interface, or a receiver.

The processor 2201 may be one or more central processing units (CPUs). When the processor 2201 is one CPU, the CPU may be a single-core CPU or a multi-core CPU.

The processor 2201 in the detection apparatus reads and executes program code stored in the memory 2202, to perform the following operations: receiving a radio frequency signal; determining an intermediate frequency signal based on an oscillation signal and the radio frequency signal, where the oscillation signal belongs to a first frequency band; performing first processing on the intermediate frequency signal, to determine a first detection result; performing second processing on the intermediate frequency signal, to determine a second detection result; and determining a state of the first frequency band based on the first detection result and the second detection result.

For specific details of each operation performed by the processor 2201 in FIG. 22, correspondingly refer to the corresponding description of the method embodiment shown in FIG. 18. By using the detection apparatus shown in FIG. 22, a frequency band state can be determined by using a same threshold, so that in a use scenario of a cooperative radar, fairness in selecting resources can be balanced; in addition, the frequency band state can be determined with reference to an anti-interference capability of a detection apparatus, to increase resource utilization.

Another embodiment of this application provides a computer program product. When the computer program product runs on a computer, the method in the embodiment shown in FIG. 15 or FIG. 18 is implemented.

Another embodiment of this application provides a computer-readable storage medium. The computer-readable storage medium stores a computer program, and when the computer program is executed by a computer, the method in the embodiment shown in FIG. 15 or FIG. 18 is implemented.

Another embodiment of this application provides a chip. The chip is applied to a detection apparatus. The chip includes one or more interface circuits and one or more processors. The interface circuit is interconnected to the processor by using a line. The interface circuit is configured to: receive a signal from a memory of the detection apparatus, and send the signal to the processor. The signal includes a computer instruction stored in the memory. When the processor executes the computer instruction, the detection apparatus performs the method of the embodiment shown in FIG. 15 or FIG. 18.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to an apparatus, wherein the method comprises:

receiving a radio frequency signal;

determining an intermediate frequency signal based on an oscillation signal and the radio frequency signal, wherein the oscillation signal belongs to a frequency band;

performing first processing on the intermediate frequency signal comprising sampling the intermediate frequency signal to obtain a set of first sampling points and a plurality of second sampling points that are a subset of the set of first sampling points;

determining a first detection result by comparing a first reference value with a value of a ratio of a quantity of the second sampling points to a quantity of the first sampling points, wherein each second sampling point is a sampling point having an amplitude greater than a second reference value, or having a power greater than a third reference value;

determining the first detection result indicates the frequency band is in a busy state;

performing second processing on the intermediate frequency signal to determine a second detection result that indicates whether the frequency band is in a second busy state, wherein the second detection result indicates an operational state of the frequency band, and wherein the operational state includes information characterizing interference of the frequency band; and outputting the second detection result.

2. The method according to claim 1, wherein performing the second processing on the intermediate frequency signal is based on the ratio of the quantity of the second sampling points to the quantity of the first sampling points indicating the frequency band is in the busy state.

3. The method according to claim 1, wherein performing the second processing on the intermediate frequency signal, to determine the second detection result comprises:

performing two-dimensional Fourier transform on the intermediate frequency signal to obtain a first data result;

determining an amplitude or a power of the data result; and comparing the amplitude of the data result with a fourth reference value, or comparing the power of the data result with fifth reference value, to obtain the second detection result characterizing interference in the frequency band.

4. The method according to claim 3, wherein the amplitude of the data result is compared with the fourth reference value and, based on the amplitude of the data result being greater than the fourth reference value, determining that the state of the frequency band is a first state; or based on the amplitude of the data result not being greater than the fourth reference value, determining the state of the frequency band is a second state.

5. The method according to claim 3, wherein the power of the first data result is compared with the eighth threshold and, based on determining the power of the first data result is greater than the eighth threshold, determining that the state of the first frequency band is a first state; or based on the power of the first data result not being greater than the eighth threshold, determining that the state of the first frequency band is a second state.

6. The method according to claim 1, wherein performing the second processing on the intermediate frequency signal to determine the second detection result characterizing interference in the frequency band comprises:

performing two-dimensional Fourier transform on the intermediate frequency signal to obtain data results; and comparing a quantity of a subset of the data results with a fourth reference value, or comparing a ratio of the quantity of the subset of the data results to a quantity of the data results with a fifth reference value, to determine the second detection result, wherein an amplitude of each third data result in the subset of data results is greater than a sixth reference value in the data results, or wherein a power value of each data result in the subset of data results is greater than a seventh reference value in the data results.

7. The method according to claim 6, wherein the operational state is a first operational state, and wherein determining the state of the frequency band based on the second detection result comprises:

based on the quantity of the subset of data results being greater than the fourth reference value, or based on the ratio of the quantity of the subset of data results to the quantity of the data results being greater than the fifth reference value, determining the state of the frequency band is the first operational state; or based on the quantity of the subset of data results not being greater than the fourth reference value, or based on the ratio of the quantity of the subset of data results to the quantity of the data results not being greater than the fifth reference value, determining the state of the frequency band is a second operational state.

8. The method according to claim 1, wherein the oscillation signal is generated by an oscillator and comprises first and second parts, wherein the second part of the signal generated by the oscillator comprises a transmit signal associated with the first radio frequency signal.

9. The method according to claim 1, wherein the intermediate frequency signal is a first intermediate frequency signal, the method including:

performing a third processing on a second intermediate frequency signal, to determine a third detection result;

in response to determining the third detection results indicates the second frequency band is in an idle state, determining to skip performing of additional processing on the second intermediate frequency signal; and skipping performing the additional processing on the second intermediate frequency signal.

10. An apparatus comprising:

a memory configured to store instructions; and one or more processors coupled to the memory and configured to execute the instructions to cause the apparatus to:

receive a radio frequency signal;

determine an intermediate frequency signal based on an oscillation signal and the radio frequency signal, wherein the oscillation signal belongs to a frequency band;

perform first processing on the intermediate frequency signal comprising sampling the intermediate frequency signal to obtain a set of first sampling points and a plurality of second sampling points that are a subset of the set of first sampling points;

determine a first detection result by comparing a first reference value with a value of a ratio of a quantity of the second sampling points to a quantity of the first sampling points, wherein each second sampling point is a sampling point having an amplitude greater than a second reference value, or having a power greater than a third reference value;

determine the first detection result indicates the frequency band is in a busy state;

perform second processing on the intermediate frequency signal to determine a second detection result in response to determining the frequency band is in the busy state, wherein the second detection result indicates an operational state of the frequency band, and wherein the operational state includes information characterizing interference of the frequency band; and output the second detection result.

11. The apparatus according to claim 10, wherein performing the second processing on the first intermediate frequency signal to determine the second detection result comprises:

performing two-dimensional Fourier transform on the intermediate frequency signal to obtain a data result;

determining an amplitude or a power of the data result; and comparing the amplitude of the data result with a fourth reference value, or comparing the power of the data result with fifth reference value, to obtain the second detection result characterizing interference in the frequency band.

12. The apparatus according to claim 10, wherein the intermediate frequency signal is a first intermediate frequency signal, and wherein the one or more processors, when executing the instructions stored in the memory, is further configured to cause the apparatus to:

perform a third processing on a second intermediate frequency signal, to determine a third detection result;

in response to determining the third detection results indicates the second frequency band is in an idle state, determine to skip performing of additional processing on the second intermediate frequency signal; and skip performing the additional processing on the second intermediate frequency signal.

13. A method, applied to an apparatus, wherein the method comprises:

receiving a radio frequency signal;

determining an intermediate frequency signal based on an oscillation signal and the radio frequency signal, wherein the oscillation signal belongs to a first frequency band;

performing first processing on the intermediate frequency signal to determine a first detection result, wherein the first processing comprises:

sampling the intermediate frequency signal to obtain a plurality of first sampling points; and determining the first detection result by comparing a ratio of a quantity of second sampling points to a quantity of the plurality of the first sampling points with a fourth threshold, wherein an amplitude of each of the quantity of second sampling points is greater than a fifth threshold in the plurality of the first sampling points, or wherein power of each of the second sampling points is greater than a sixth threshold in the plurality of the first sampling points;

determining the first detection result indicates the first frequency band is in a busy state, including determining the ratio of the quantity of the second sampling points to the quantity of the plurality of first sampling points is greater than the fourth threshold;

in response to determining the first frequency band is in the busy state, performing second processing on the intermediate frequency signal to determine a second detection result; and determining a state of the first frequency band based on the second detection result; and in response to determining a state of the first frequency band based on the second detection result, outputting the determined state of the first frequency band.

14. The method according to claim 13, wherein determining the first detection result comprises:

determining an amplitude or a power of the intermediate frequency signal for each of the quantity of second sampling points; and comparing the amplitude of each of the quantity of second sampling points with the fifth threshold, or comparing the power of each of the quantity of second sampling points with the sixth threshold, to determine the first detection result.

15. The method according to claim 13, wherein performing the second processing on the intermediate frequency signal, to determine the second detection result comprises:

performing two-dimensional Fourier transform on the intermediate frequency signal to obtain first data result;

determining an amplitude or a power of the first data result; and determining the second detection result based on comparing the amplitude of the first data result with a seventh threshold, or comparing the power of the first data result with an eighth threshold, or performing two-dimensional Fourier transform on the intermediate frequency signal to obtain a second data result; and determining the second detection result based on comparing a quantity of third data results with a ninth threshold, or comparing a ratio of the quantity of the third data results to a quantity of the second data results with a tenth threshold, wherein each third data result is a data result whose amplitude is greater than an eleventh threshold in the second data results, or wherein each third data result is a data result whose power is greater than a twelfth threshold in the second data results.

* * * * *